United States Patent
Johansson et al.

(10) Patent No.: US 11,134,044 B1
(45) Date of Patent: Sep. 28, 2021

(54) MESSAGE ATTACHMENT PROVISIONING

(71) Applicant: Amazon Technologies, Inc., Seattle, WA (US)

(72) Inventors: Jesper Mikael Johansson, Redmond, WA (US); Marc Blank, Bend, OR (US)

(73) Assignee: Amazon Technologies. Inc., Seattle, WA (US)

( * ) Notice: Subject to any disclaimer, the term of this patent is extended or adjusted under 35 U.S.C. 154(b) by 342 days.

(21) Appl. No.: 14/662,112

(22) Filed: Mar. 18, 2015

(51) Int. Cl.
*H04L 12/58* (2006.01)

(52) U.S. Cl.
CPC .............. *H04L 51/08* (2013.01); *H04L 51/18* (2013.01)

(58) Field of Classification Search
CPC ................................ H04L 51/08; H04L 51/18
USPC .......................................................... 709/206
See application file for complete search history.

(56) References Cited

U.S. PATENT DOCUMENTS

| | | | | |
|---|---|---|---|---|
| 6,360,252 B1 * | 3/2002 | Rudy | ..................... | G06Q 10/10 709/206 |
| 8,589,541 B2 * | 11/2013 | Raleigh | ............... | H04L 41/0893 455/405 |
| 9,203,789 B2 * | 12/2015 | Dennis | ................. | G06Q 10/107 |
| 9,894,020 B2 * | 2/2018 | Shkolnikov | ........... | H04L 51/063 |
| 2002/0091928 A1 * | 7/2002 | Bouchard | ............. | H04L 9/3297 713/178 |
| 2004/0185877 A1 * | 9/2004 | Asthana | ................. | G06Q 30/02 455/456.6 |
| 2005/0170815 A1 * | 8/2005 | Kim | ........................ | H04W 4/12 455/412.1 |
| 2005/0223074 A1 * | 10/2005 | Morris | ................. | G06Q 10/107 709/207 |
| 2012/0278405 A1 * | 11/2012 | Costenaro | ........... | H04L 67/2857 709/206 |
| 2013/0218982 A1 | 8/2013 | Hymel et al. | | |
| 2015/0046919 A1 * | 2/2015 | Chen | ........................ | G06F 8/61 717/178 |
| 2015/0326517 A1 * | 11/2015 | Block | ..................... | H04L 29/06 726/7 |
| 2015/0350133 A1 * | 12/2015 | Murphy | .................. | H04L 67/42 709/203 |

OTHER PUBLICATIONS

Freed et al., "Multipurpose Internet Mail Extensions (MIME) Part One: Format of Internet Message Bodies," Network Working Group, Request for Comments: 2045, Nov. 1996, 32 pages.

(Continued)

*Primary Examiner* — Umar Cheema
*Assistant Examiner* — John Fan
(74) *Attorney, Agent, or Firm* — Davis Wright Tremaine LLP

(57) ABSTRACT

A messaging service receives an electronic message, including an attachment, from a sender client device and addressed to a recipient client device. The messaging service obtains information associated with the recipient client device to determine one or more actions that may be performed with regard to the attachment included within the electronic message. Once the determination as to the one or more actions has been made, the messaging service may perform the one or more actions, which may include transformation of the electronic message. The messaging service may subsequently provide the electronic message to the recipient client device in accordance with the performed one or more actions.

20 Claims, 11 Drawing Sheets

(56) References Cited

OTHER PUBLICATIONS

Freed et al., "Multipurpose Internet Mail Extensions (MIME) Part Two: Media Types," Network Working Group, Request for Comments: 2046, Nov. 1996, 45 pages.

Freed et al., "Multipurpose Internet Mail Extensions (MIME) Part Five: Conformance Criteria and Examples," Network Norking Group, Request for Comments: 2049, Nov. 1996, 25 pages.

Freed et al., "Media Type Specifications and Registration Procedures," Network Working Group, Request for Comments: 4288, Dec. 2005, 25 pages.

Freed et al., "Multipurpose Internet Mail Extensions (MIME) Part Four: Registration Procedures," Network Working Group, Request for Comments: 4289, Dec. 2005, 12 pages.

Moore, "MIME (Multipurpose Internet Mail Extensions) Part Three: Message Header Extensions for Non-ASCII Text," Network Working Group, Request for Comments: 2047, Nov. 1996, 16 pages.

\* cited by examiner

MESSAGE ATTACHMENT PROVISIONING

BACKGROUND

Messaging services, such as electronic mail services, often enable customers and other users to communicate with one another remotely through use of electronic messages. A user sending an electronic message may include, within the message, one or more computer files in the form of attachments. However, the size of attachments (e.g., the size of individual attachments and/or the aggregate size of attachments) can create numerous issues. For example, some devices have limited storage capacity that can be filled by attachments. Additionally, use of some networks (e.g., mobile phone service provider networks) to transfer attachments to recipient devices may result in contributing to or exceeding a data transfer limit set for the networks. At the same time, attachments are often ignored by message recipients for various reasons, such as inapplicability, difficulty viewing the attachment on a mobile device, etc.

BRIEF DESCRIPTION OF THE DRAWINGS

Various embodiments in accordance with the present disclosure will be described with reference to the drawings, in which.

DETAILED DESCRIPTION

Figure 1:
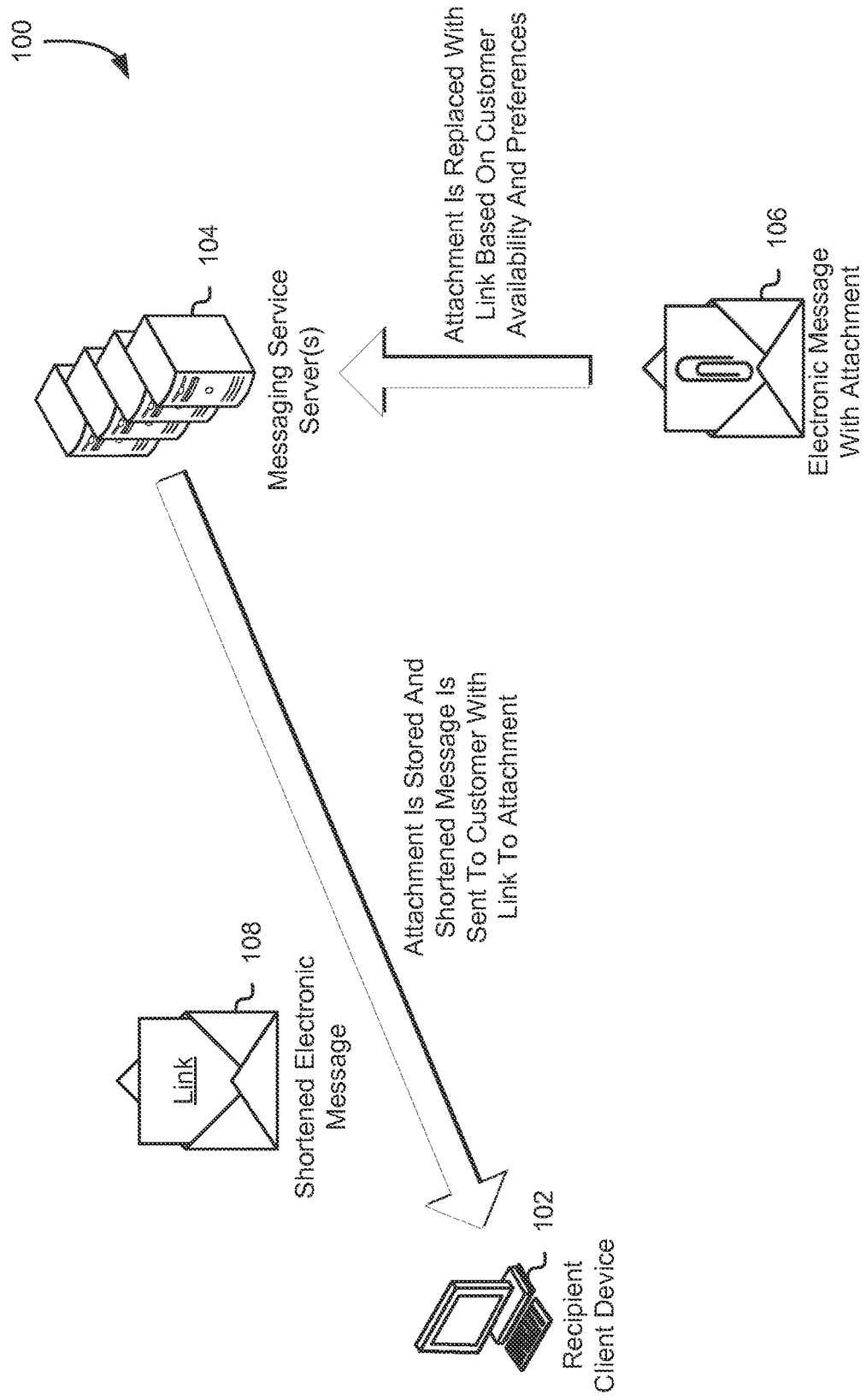
FIG. 1 shows an illustrative example of an environment in which various embodiments can be implemented.
Figure 2:
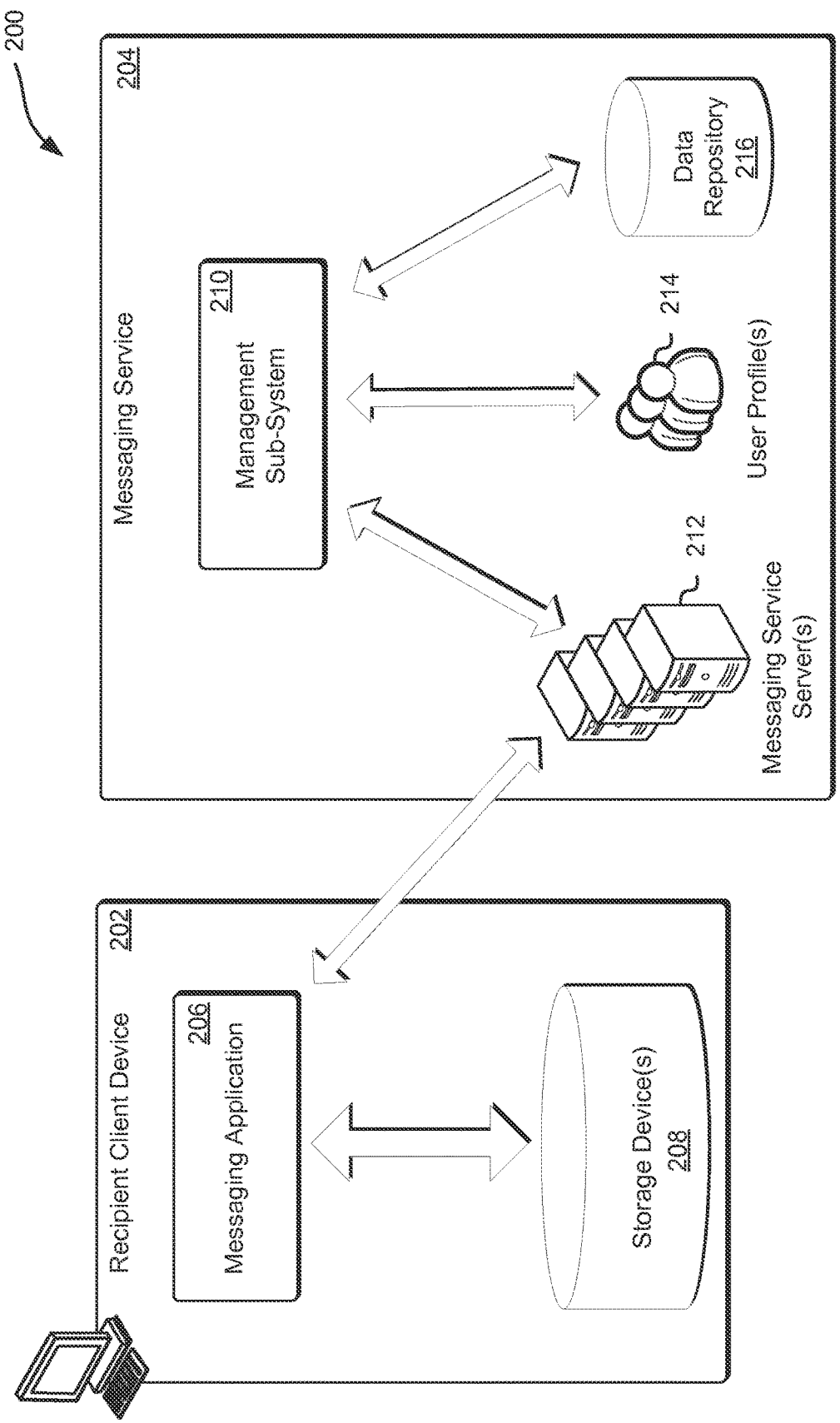
FIG. 2 shows an illustrative example of an environment in which a recipient client device receives messages including attachments or links from a messaging service based at least in part on various recipient factors in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested relate to methods and systems for determining, based on information associated with a recipient client device, whether to perform a set of operations that may include storing an attachment from an electronic message, such as a calendar event message, to be delivered to the recipient client device and substituting the attachment within the electronic message with a link to the attachment. The calendar event message may include meeting requests and/or tasks that may be performed by the recipient of the message. These meeting requests and/or tasks may be added to the recipient's schedule through a messaging application. In an embodiment, a messaging service detects a triggering event to download an electronic message to a recipient messaging client installed on a recipient client device. For instance, the messaging service may receive a request from a recipient messaging client installed on the recipient client device to download any messages addressed to the recipient onto the recipient client device. Alternatively, the messaging service may, upon receiving an electronic message addressed to the recipient, attempt to download the electronic message to the recipient client device. This electronic message may include an attachment, which may include a variety of computer files that may be accessed through the recipient client device and used for a variety of purposes.

As a result of the messaging service detecting this triggering event to download an electronic message, such as a calendar event message, that includes an attachment onto the recipient client device through the recipient messaging client, the messaging service determines whether the electronic message is to be downloaded onto a mobile computing device (e.g., smartphones, laptop computers, cellular telephones, tablets, smart glasses, smartwatches, etc.). In an embodiment, the messaging service determines whether to store the attachment included in the electronic message in a data repository and substitute the attachment with a link to the attachment within the data repository based at least in part on a set of characteristics of the client device, which may be based at least in part on data recorded about the client device. For instance, a recipient client device may be subject to data usage limits, have reduced storage capacity and capabilities when compared to other computing devices, and may be utilized in potentially dangerous locations. Thus, if the messaging service determines that the electronic message is to be downloaded onto a mobile client device, the messaging service may determine the data usage for the device to determine whether the data usage limits have been exceeded. Further, the messaging service may store the attachment included within the electronic message onto a data repository, which may be accessible by the recipient through the recipient messaging client installed on the recipient client device. If the electronic message is to be downloaded onto a non-mobile computing device (e.g., desktop computing devices, computing devices requiring physical network connectivity, etc.), the messaging service may download the complete electronic message, including the attachment, onto the recipient client device.

The messaging service may utilize additional information concerning the recipient client device to determine the manner for providing the electronic message, such as a calendar event message, to the device through the recipient messaging client. For example, the messaging service may be configured to determine the location of the recipient client device based on network-based information, global positioning system (GPS) coordinates, Wi-Fi data and the like. The messaging service may determine, based on this location, whether the recipient client device is in a dangerous location (e.g., locations where devices are subject to searches without lawful permission, devices that may include sensitive data or other information, locations where there is a high occurrence of device theft, locations where there is a high occurrence of data theft, etc.). If the messaging service determines that the device is located in a dangerous location, the messaging service may store the attachment within a data repository maintained by the messaging service and provide, to the recipient messaging client a shortened electronic message, such as a calendar event message, that includes, instead of the attachment, a link to the attachment within the data repository. Further, if the recipient selects the link within the message, the recipient may be required to provide a set of credentials to obtain the attachment. In another embodiment, the messaging service obtains configuration information for the recipient client device, which may be used to determine the applications installed on the device or other devices within proximity of the user and the graphical capabilities of the device. Based on this information, the messaging service may determine whether to provide a down-sampled attachment to the recipient messaging client, an executable file or installer for a required application needed to access the attachment, a link to the attachment, or the complete electronic message. Additionally, or alternatively, the messaging service may access a recipient's schedule to determine whether the recipient client device will be offline for a prolonged period of time. If so, the messaging service may download complete electronic messages to the recipient client device in order to enable the recipient to access any attachments while offline.

In this manner, the messaging service may selectively provide complete or partial electronic messages to a recipient client device based on information about the device and the recipient's own schedule. In addition, the techniques described herein facilitate additional technical advantages. For example, because, in some embodiments, the messaging service may replace the attachment with a link that may enable the recipient to access the attachment through a data repository provided by the messaging service, the recipient may determine when it is appropriate for the attachment to be downloaded onto the recipient client device. For instance, the recipient may, through the messaging client, select the link when the device's data usage limits have been replenished or when he/she is in a more secure location. Additionally, the messaging service may enable the recipient to determine whether to install, at any time, any applications required to access the attachment through a provided link to the applications or through an installer included with the message. This may provide the recipient with greater flexibility while minimizing unnecessary data usage.

FIG. 1 shows an illustrative example of an environment 100 in which various embodiments can be implemented. In the environment 100, a sender, through a messaging client installed on his/her computing device, may generate an electronic message 106 that is addressed to a recipient, who may be a customer of a messaging service. The recipient may utilize a recipient client device 102 to obtain these electronic messages 106 from one or more messaging service servers 104 operated and maintained by the messaging service. The electronic message 106 generated by the sender may include a component, which may comprise one or more computer files, attachments, and other electronic message 106 parts that may be accessible through one or more applications which may be installed on the recipient client device 102 or through other applications that may be available for installation on the recipient client device 102. The electronic message 106 may include e-mail messages, calendar event messages, short messaging service (SMS) messages and other text messaging formats, instant messages through an instant messaging service, bulletin board system (BBS) messages, and the like. In some embodiments, the electronic message 106 may include one or more Multi-Purpose Internet Mail Extensions (MIME) parts, each of which may denote various components of the electronic message 106. For instance, the electronic message 106 may include a MIME part for plain text, a MIME part for a non-textual attachment, and a MIME part for header information. The MIME Internet standard is defined in six linked Request For Comments (RFC) memoranda: RFC 2045, RFC 2046, RFC 2047, RFC 4288, RFC 4289 and RFC 2049, which together define specifications of the MIME standard and are incorporated herein by reference.

When the sender transmits, through a system (e.g., messaging application, web electronic mail service, etc.), the electronic message 106 including the attachment or other component to the recipient's recipient client device 102 or other system (e.g., web electronic mail service, etc.), the electronic message 106 may be received by the one or more messaging service servers 104 for distribution. For example, if the electronic message 106 is an e-mail originated from the sender system and destined for a recipient system through an e-mail address (e.g., juandelpueblo@example.com), the electronic message 106 may be received by an outgoing mail server utilizing a Simple Mail Transfer Protocol (SMTP), which may, in turn, provide the electronic message 106 to a Domain Name System (DNS) server configured to translate the domain specified in the address (e.g., example.com) into an Internet Protocol (IP) address. Next, the outgoing mail server may determine whether the domain has the one or more messaging service servers 104. If so, the outgoing mail server may transmit the electronic message 106 to the one or more messaging service servers 104 for distribution to the recipient's recipient client device 102 using either the Post Office Protocol (POP) format or Internet Message Access Protocol (IMAP).

The messaging service, which may maintain and operate the one or more messaging service servers 104, may detect a triggering event that may cause the messaging service to download the complete electronic message 106 or a shortened version of the electronic message 104 on to the recipient's recipient client device 102. For instance, the triggering event may include any instances when an electronic message 106 addressed to the recipient is received through the one or more messaging service servers 104. Alternatively, the triggering event may include receiving a request from a messaging client installed on the recipient client device 102 to download any available electronic messages 106 addressed to the recipient. In an embodiment, when the triggering event has been detected, the messaging service accesses the recipient's schedule to determine his/her future availability. For instance, the messaging service may access the recipient's user profile maintained within a user profile data store of the messaging service to obtain the recipient's schedule. Alternatively, the messaging service, through the one or more messaging service servers 104, may obtain the recipient's schedule through synchronization of the messaging client installed on the recipient client device 102 and the recipient's user profile. Through use of this schedule, the messaging service may determine whether the recipient client device 102 is going to be unavailable (e.g., offline, in a region with poor network connectivity, etc.) for a particular period of time to access the messaging service and the one or more messaging service servers 104.

If, based at least in part on the recipient's schedule, the recipient client device 102 is going to be unavailable for a particular period of time, the messaging service, through the one or more messaging service servers 104 may transmit the full electronic message 106, including the attachments, to the recipient client device 102. This may enable the recipient to access these attachments offline without need to access the messaging service to obtain the attachments. Alternatively, if the recipient's schedule indicates that the recipient client device 102 will be available for an extended period of time, the messaging service may extract the attachment from the electronic message 106, store the attachment in a data repository within the messaging service, and substitute the attachment within the electronic message 106 with a link to the attachment within the data repository to create a shortened electronic message 108. For instance, the messaging service may evaluate the various MIME parts of the electronic message 106 to identify any attachment MIME parts that may be extracted from the electronic message 106. The messaging service may store these MIME parts within a data repository and replace these MIME parts with a link to the attachment. The messaging service, upon creation of this shortened electronic message 108, may cause the one or more messaging service servers 104 to transmit the shortened electronic message 108 to the recipient client device 102. Thus, the attachment is accessible to the recipient client device 102 via the link included within this shortened electronic message 108.

In an alternative embodiment, the messaging service may identify the location of the recipient's recipient client device 102 to generate, based at least in part on the location of the device 102, a determination whether to perform a set of operations that includes storing the at least one attachment from the electronic message in a data repository and substituting the attachment within the electronic message 106 with a link to the attachment within the data repository. For instance, the messaging service may transmit a request to the recipient client device 102 to obtain a set of GPS coordinates for the current location of the recipient client device 102. Additionally, or alternatively, the recipient client device 102 may provide network information to the messaging service, which may be used to identify the location of the recipient client device 102. Based at least in part on this information, the messaging service may determine whether the recipient client device 102 is currently located in a potentially dangerous location. A dangerous location may include a location where devices are subject to searches without lawful permission, any location where sensitive data or other information is not permitted, a location where there is a high occurrence of device theft, locations where there is a high occurrence of data theft, a location where network traffic is monitored, and the like. In some cases, dangerous locations may be user-defined or defined by a provider of the recipient client device 102, the sender of the electronic message 106, or some other entity authorized to establish policies for the messaging service and/or the recipient client device 102. For instance, an employer or company associated with a user of the recipient client device 102 may generate one or more policies defining dangerous locations for the device 102.

If the messaging service determines, based at least in part on the identified location of the recipient client device 102, that the device 102 is in a dangerous location, the messaging service may store the attachment, and any potentially sensitive information included within the electronic message 106, within the data repository. Further, the messaging service may substitute the attachment and the sensitive information with a link to an authentication component of the messaging service to create a shortened electronic message 108. The recipient may utilize this link to access the authentication component and provide a set of credentials usable by the messaging service to authenticate the recipient and enable the recipient to access the data repository to access the attachment and the sensitive information extracted from the original electronic message 106.

In yet another embodiment, the messaging service is configured to access information associated with an application installed on the recipient client device 102 to obtain configuration information for the device 102. For instance, the messaging service, based at least in part on this configuration information, may determine whether an application required to access an attachment in the electronic message 106 is installed on the computing device 102. If no application is installed on the device 102 that can be utilized to access the attachment is available, the messaging service may store the attachment within the data repository and replace the attachment with a link to an installer that can be utilized to install the required application on the recipient client device 102. When the recipient utilizes this installer within the shortened electronic message 108, the installer may access a remote server to obtain the necessary computer files to install the application onto the device 102. Alternatively, the entire application may be provided within the shortened electronic message 108. The messaging service may also provide, within the shortened electronic message 108, a link to an application marketplace or other application provider to enable the recipient to download the application. Once the recipient of the shortened electronic message 108 installs the required application onto the recipient client device 102, the messaging service may alter the shortened electronic message 108 to include a link to the attachment stored within the data repository. This may enable the recipient to access the data repository to obtain the attachment and utilize the installed application to access the attachment as needed.

In another instance, the messaging service may utilize the obtained configuration information for the recipient client device 102 to determine whether the attachment included within the electronic message 106 should be stored within the data repository and substituted, within a shortened electronic message 108, with a down-sampled version of the attachment. For example, if the shortened electronic message 108 is to be downloaded onto a mobile device that includes a low resolution (relative to high-definition monitors) screen, and the attachment includes an image (e.g., picture), the messaging service may down-sample the image such that optimal viewing of the image may be achieved through the mobile device without including unnecessary resolution and detail that may not be captured through the mobile device. This may include the use of bicubic interpolation algorithms or other image down-sampling algorithms to down-sample the image. In some instances, if the messaging service determines that the recipient client device 102 already includes the image included in the original electronic message 106 or a similar image, the messaging service may generate a shortened electronic message 108 that includes vector and/or transformation data that, when received by the device 102, may enable the device 102 to utilize this data to locally reconstruct the original image provided within the electronic message 106. The shortened electronic message 108 may further include a link to the unaltered attachment within the data repository. This may enable the recipient, through his/her recipient client device 102, to access the data repository to obtain the unaltered attachment if necessary and at any time.

As noted above, the messaging service may include one or more messaging service servers, which may be used to receive one or more electronic messages, such as a calendar event messages from a variety of senders and to transmit either the one or more electronic messages as provided by these senders or shortened electronic messages to the intended recipients of these messages. The messaging service may be configured to determine, based at least in part on information associated with a recipient's recipient client device, whether the original electronic message or a shortened electronic message is to be transmitted to the recipient's recipient client device. Accordingly, FIG. 12 shows an illustrative example of an environment 200 in which a recipient client device 202 receives messages including attachments or links from a messaging service 204 based at least in part on various recipient factors in accordance with at least one embodiment. In the environment 200, the messaging service 204 may include one or more messaging service servers 212 configured to receive one or more electronic messages and calendar event messages from various senders and addressed to various recipients. These electronic messages and calendar event messages generated by these various senders may include attachments, which may comprise one or more computer files that may be accessible through one or more applications which may be installed on the recipient client device 202 or through other applications that may be available for installation on the recipient client device 202.

When a sender transmits an electronic message including an attachment to the recipient's recipient client device 202, the electronic message may be received by the one or more messaging service servers 212 for distribution. The messaging service 204, through the messaging service servers 212, may detect a triggering event that may cause the messaging service servers 212 to transmit the complete electronic message or a shortened version of the electronic message on to the recipient's recipient client device 202. For instance, the triggering event may include any instances when an electronic message addressed to the recipient is received through the one or more messaging service servers 212. Alternatively, the triggering event may include receiving a request from a messaging application 206 installed on the recipient client device 202 to download any available electronic messages addressed to the recipient.

The messaging service servers 212 may subsequently access information associated with the messaging application 206 installed on the recipient client device 202. For instance, the servers 212 may cause the management sub-system 210 to obtain, from a user profile data store 214, a recipient's schedule in order to determine the availability of the recipient client device 202 in the future. For instance, the messaging application 206 installed on the recipient client device 202 may be configured to synchronize the recipient's schedule with the recipient's user profile within the user profile data store 214. Thus, the messaging application 206 may transmit an updated version of the recipient's schedule to the messaging service servers 212, which, in turn, may provide the updated schedule to the management sub-system 210 for storage in the user profile data store 214. Alternatively, the recipient's schedule may be maintained solely through the messaging service 204, such that the recipient may utilize the messaging application 206 to access, from the user profile data store 214, his/her schedule and make any necessary changes.

In an embodiment, the one or more messaging service servers 212 obtains, from the messaging application 206, information regarding the current location of the recipient client device 202. For instance, the messaging application 206 may provide a set of GPS coordinates, which may specify the location of the recipient client device 202. Additionally, or alternatively, the messaging service servers 212 may determine, through network information obtained through the connection between the messaging application 206 and the messaging service servers 212, the location of the recipient client device 202. The one or more messaging service servers 212 may further obtain, from the messaging application 206, information regarding applications installed on the recipient client device 202 and the configuration of the recipient client device 202 itself. For instance, the messaging application 206 may access one or more storage devices 208 of the recipient client device 202 to identify the one or more applications installed on the device 202. The one or more messaging service servers 212 may generate, based at least in part on the accessed information, a determination whether to perform a set of operations regarding the received electronic message that includes storing the attachment from the electronic message in a data repository 216 and substituting the attachment within the electronic message with a link to the attachment within the data repository 216.

Once the messaging service servers 212 have determined, based at least in part on the accessed information, whether to perform the set of operations regarding the received electronic message, the servers 212 may provide the electronic message with the link to the recipient client device 202 through the messaging application 206 in accordance with the generated determination such that, when the determination is to perform the set of operations, the attachment is accessible to the recipient client device 202 via the link. For instance, if the messaging service servers 212 determine, based at least in part on the accessed information that the recipient client device 202 is located in a dangerous location, the messaging service servers 212 may extract the attachment from the electronic message and store the attachment within the data repository 216. Subsequently, the servers 212 may substitute a link to an authentication component (not shown) of the messaging service 204, which may prompt the recipient to provide his/her set of credentials in order to access the attachment stored in the data repository 216.

The link may include a Uniform Resource Identifier (URI), such as Uniform Resource Locators (URLs) and Uniform Resource Names (URNs), which may be utilized to access the attachment within the data repository 216. The URI may be obtained in a variety of ways. For instance, in an embodiment, when the management sub-system 210 stores the attachment within the data repository 216, the data repository 216 will generate an identifier for the attachment that may be utilized to locate the attachment within the data repository 216. The one or more messaging service servers 212 may obtain this identifier from the data repository 216 and utilize the identifier to generate the URI to be included within the shortened electronic message. In an alternative embodiment, the servers 212 will randomly generate an identifier for the attachment and utilize the identifier in a PUT command to the data repository 216 to store the attachment within the data repository 216. This randomly generated identifier may then be utilized to generate the link to the attachment. In some embodiments, if the data repository 216 is maintained through the messaging service 204, the data repository 216 may associate an identifier of the attachment with the attachment itself such that, when a link that uses the identifier is used to obtain the attachment, the data repository 216 may locate the attachment and provide the attachment to the recipient client device through the messaging service servers 212.

In an embodiment, if the messaging service servers 212 determine, based at least in part on the accessed information, that the recipient client device 202 does not have, in any of the storage devices 208, an application usable to access the attachment within the electronic message, the messaging service servers 212 will extract the attachment from the electronic message and cause the management sub-system 210 to store the attachment within the data repository 216. Additionally, the messaging service servers 212 may substitute a link to an application within the data repository 216 that may be installed on the recipient client device 202 and usable to access the attachment or to a marketplace site where the recipient may utilize his/her recipient client device 202 to obtain the application. Alternatively, the messaging service servers 212 may include, within the shortened electronic message, an installer executable file, which may be used to install the application onto the recipient client device 202. This installer may include the necessary files to install the application or may access the data repository 216 to obtain the files necessary to install the application onto the recipient client device 202.

In another embodiment, the messaging service servers 212 will cause the management sub-system 210 to store the attachment within the data repository 216 and substitute a down-sampled attachment within the electronic message based at least in part on the configuration of the recipient client device 202. For instance, if attachment includes a high-resolution image with high pixel density but the recipient client device 202 cannot take advantage of the high pixel density (e.g., lower pixel density capabilities), the messaging service servers 212 may down-sample the image such that the down-sampled image has a lower pixel density but is still recognizable and usable through the recipient client device 202. The electronic message may further include a link to the original, unaltered attachment stored within the data repository 216. Thus, a recipient of the electronic message wanting to access this unaltered attachment may access the data repository 216 to obtain the attachment.

The messaging service servers 212 may further utilize the accessed information to determine a recipient's availability in the near future. For instance, the messaging service servers 212 may evaluate the recipient's schedule to determine whether the recipient client device 202 will be unavailable or offline for a period of time in the near future. For example, if the recipient is scheduled to be travelling for several hours or is going to be in a location with limited or no network connectivity, the one or more messaging service servers 212 may transmit the complete electronic message to the messaging application 206 of the recipient client device 202 to enable access to the attachments while offline. Alternatively, if the recipient client device 202 will be available for a prolonged period of time, the one or more messaging service servers 212 may utilize other information to determine whether to store the attachment within the data repository 216 and either down-sample the attachment and/or substitute a link to the attachment stored within the data repository 216.

In some embodiments, the messaging application 206 may comprise a split architecture whereby a portion of the processing may be performed locally within the recipient client device 202 and another portion of the processing may be performed remotely through one or more servers maintained by a service provider. For instance, the messaging application 206 may store the recipient's schedule within these one or more servers. Thus, these remote servers may transmit an updated version of the recipient's schedule to the messaging service servers 212 rather than the components of the messaging application 206 operating within the recipient client device 202.

It should be noted that while attachments may be stored within a data repository 216 upon determination that a shortened electronic message is to be transmitted to the recipient client device 202, attachments may be stored on other devices that the recipient may have access to when viewing the shortened electronic message. For instance, the messaging service servers 212 may identify one or more proxy computing devices that may be used for storing attachments and other data. The messaging application 206 installed on the recipient client device 202 may transmit information (e.g., IP addresses, available storage capacity, etc.) of these proxy computing devices to the messaging service servers 212, which may then select one or more proxy computing devices and download the attachment to these devices. The messaging service servers 212 may then generate a link to the attachment, which may indicate where the attachment is stored. In some embodiments, if the recipient utilizes the messaging application 206 through a public computing system (e.g., local coffee shop computer, Internet café, etc.), the messaging service servers 212 may transmit the attachment to one or more computing devices within the public computing system to enable the recipient to access the attachment locally. In other instances, if the recipient utilizes the messaging application 206 through an employer-provided computer system, the messaging service servers 212 may transmit the attachment to a local employer server, which may be accessible to the recipient through the employer-provided computer system. Other examples of attachment storage may include computing devices owned by other entities/individuals that may be trusted by the recipient, a mobile storage device installed on vehicles (e.g., drones, automobiles, other vehicles dispatched to the location of the user to provide temporary access to media, etc.).

Figure 3:
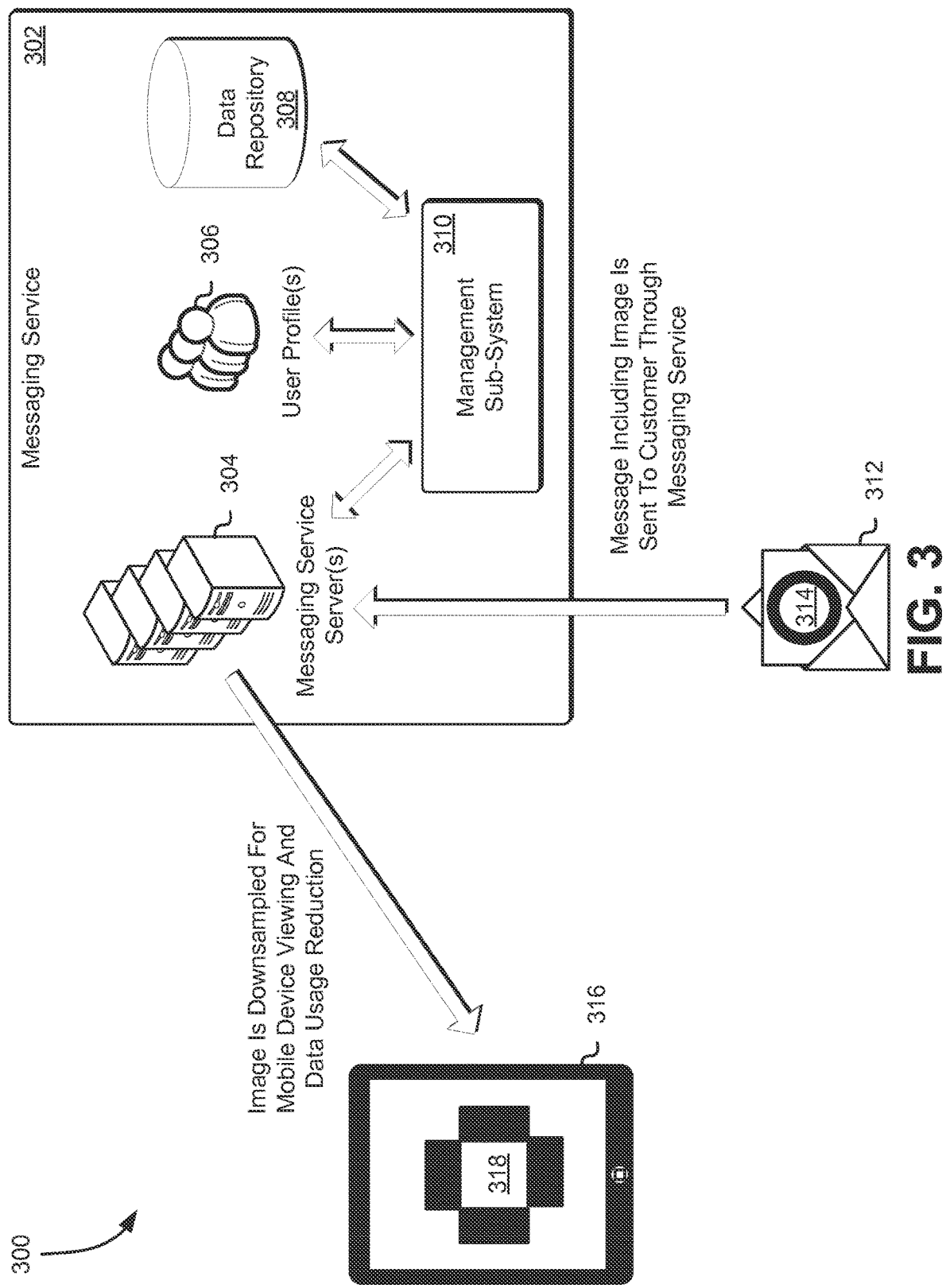
FIG. 3 shows an illustrative example of an environment in which a recipient client device receives a message including a down-sampled attachment based at least in part on the recipient client device used to access the messaging service in accordance with at least one embodiment.

As noted above, a messaging service, based at least in part on accessed information regarding the configuration of a recipient client device, may determine whether to store an attachment from an electronic message, such as a calendar event message, in a data repository and substitute a down-sampled attachment into a shortened electronic message to be sent to the recipient. Accordingly, FIG. 3 shows an illustrative example of an environment 300 in which a recipient client device 316 receives a message including a down-sampled attachment 318 based at least in part on the recipient client device 316 used to access the messaging service 302 in accordance with at least one embodiment. In the environment 300, a sender transmits an electronic message 312 that includes at least one attachment 314 and is addressed to a recipient client (e.g., e-mail address, etc.). The at least one attachment 314 may include a picture or other image that may have a high pixel density, resulting in a high-capacity attachment 312 that may consume significant storage capacity on the recipient client device 316. Additionally, or alternatively, the recipient client device 316 may not be capable of taking advantage of the higher pixel density, as the recipient client device 316 may not have a display component capable of displaying an image within such high pixel density.

When the messaging service servers 304 receive the electronic message 312 from a sender, the management sub-system 310 may access the recipient's user profile from the user profile data store 306 to obtain information regarding the recipient client device 316. Alternatively, the management sub-system 310, through the one or more messaging service servers 304, may transmit a request to a messaging application installed on the recipient client device 316 to obtain the configuration information for the recipient client device 316. With this information, the management sub-system 310 may determine whether the recipient client device 316 is capable of taking advantage of the full attachment 314 within the electronic message 312. For instance, the management sub-system 310 may evaluate the pixel density of the attachment 314 and the display pixel density for the recipient client device 316 to determine whether the recipient client device 316 is capable of taking advantage of the full pixel density of the attachment 314.

If the management sub-system 310 determines that the recipient client device 316 cannot take advantage of the full attachment 314, the management sub-system 310 may extract the attachment 314 from the electronic message 312 and store the attachment 314 within the data repository 308. Further, the management sub-system 310 may substitute a down-sampled attachment 318 within the electronic message 312. This down-sampled attachment 318 may, for example, have a lower pixel density consistent with the configuration of the recipient client device 316. Alternatively, the down-sampled attachment 318 may be modified such that the fidelity of the attachment 318, when accessed through the recipient client device 316, is sufficient for the recipient client device 316 and is thus usable through the recipient client device 316. The electronic message 312 may further include a link to the unaltered attachment 314 stored within the data repository 308 to enable the recipient to obtain the attachment 314 as needed.

However, if the recipient client device 316 is capable of fully utilizing the attachment 314, the management sub-system 310 may instead enable the one or more messaging service servers 304 to transmit the electronic message 312 with the original attachment 314 to the recipient client device 316. It should be noted that in some embodiments, the management sub-system 310 may consider other information accessed from the user profile data store 306 or from the recipient client device 316 to determine whether to down-sample the attachment 314 in the electronic message. For instance, the management sub-system 310 may determine, based on the accessed information, that the recipient client device 316 is approaching a data usage limit imposed by a network provider or the recipient himself/herself. Based at least in part on this data usage limit, the management sub-system 310 may determine whether to down-sample the attachment 314 and to what degree. In some embodiments, the management sub-system 310 may further consider the available data usage capabilities of other client devices of users associated with a user of the recipient client devices 316 to determine whether to down-sample the attachment 314. For instance, if another associated client device is not approaching a data usage limit, the management sub-system 310 may transmit the attachment 314 to this other associated client device and provide the down-sampled attachment to the recipient client device 316.

As noted above, a messaging service may determine, based at least in part on accessed information regarding the location of a recipient client device, whether the recipient client device is in a location that is considered dangerous or otherwise presents significant privacy risks for the recipient. If it is determined that the recipient client device is located in a dangerous location, the messaging service may substitute the attachment in the electronic message, such as a calendar event message, with a link to an authentication component, which may require the recipient to provide a set of credentials to access the attachment. Accordingly, FIG. 13 shows an illustrative example of an environment 400 in which a recipient is required to provide a set of credentials to obtain one or more attachments from an electronic message as a result of detection of the recipient client device 412 being located in a dangerous location in accordance with at least one embodiment.

In the environment 400, the messaging service servers 404 may obtain information from the recipient client device 412 that may be used to determine the current location of the recipient client device 412. For instance, when the recipient client device 412, through a messaging application, transmits a request to the messaging service 402 to obtain one or more electronic messages addressed to the recipient client, the recipient client device 412 may provide a set of GPS coordinates and/or network information that may be utilized by the messaging service 402 to determine the location of the recipient client device 412. The management sub-system 410 may evaluate this information and determine whether the recipient client device 412 is located in a potentially dangerous location. In an alternative embodiment, the management sub-system 410 can access location information from the user profile data store 406, which may specify the most common locations where the recipient client device 412 is utilized. Based at least in part on this information, the management sub-system 410 may determine whether the recipient client device 412 is likely to be utilized in a dangerous location.

Figure 4:
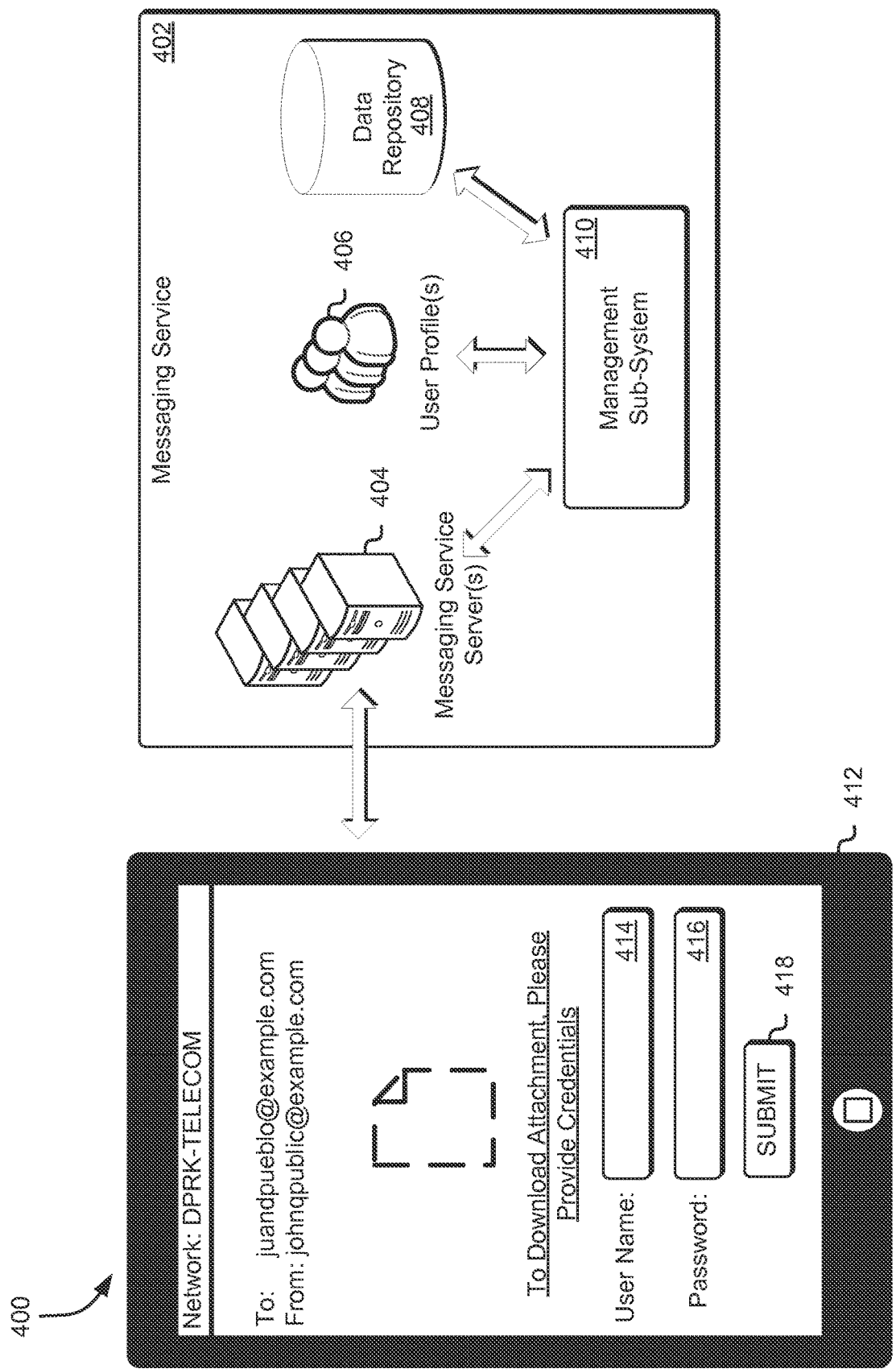
FIG. 4 shows an illustrative example of an environment in which a recipient is required to provide a set of credentials to obtain one or more attachments from a message as a result of detection of the recipient client device being located in a dangerous location in accordance with at least one embodiment.

If the management sub-system 410 determines, based at least in part on information obtained from the recipient client device 412 or from the user profile data store 406, that the recipient client device 412 is likely being utilized in a dangerous location, the management sub-system 410 may store any attachments within electronic messages addressed to the recipient client in a data repository 408. Further, the management sub-system 410 may substitute a link to an authentication component, which may require the recipient to provide a set of credentials to access the attachments from the data repository 408. For instance, as illustrated in FIG. 4, when a recipient selects the link, the recipient may be presented, through the recipient client device 412, with a user name input field 414 and a password input field 416. The recipient may utilize his/her recipient client device 412 to provide his/her set of credentials through these input fields 414, 416 and select a submit button 418 to transmit this set of credentials to the one or more messaging service servers 404.

The management sub-system 410 may obtain the set of credentials from the messaging service servers 404 and may subsequently access the user profile data store 406 to determine whether the recipient may be authenticated. If so, the management sub-system 410 may enable the recipient to access the data repository 408 to obtain any attachments associated with the shortened electronic message transmitted to the recipient client device 412. However, if the set of credentials provided are not valid or the recipient cannot be authenticated, the management sub-system 410 may deny the recipient's request to access the data repository 408 to obtain any attachments available for use.

In some embodiments, the sender of the message including the attachment may specify the time, place and manner in which the message and any attachments included within the message may be accessed by the recipient. For instance, the sender of a message may specify that no attachments or sensitive information may be provided to the recipient if the recipient is located in a potentially dangerous location. Alternatively, the sender of the message may specify that no attachments or sensitive information may be provided to the recipient if the messaging service 402 detects that the request to retrieve any messages is obtained from a device other than a managed device (e.g., a device that is approved by the sender with a full management client within an internal network known to the sender, etc.). Thus, if the recipient is utilizing a managed device and is located within a location that is not potentially dangerous, the messaging service 402 may transmit the complete electronic message to the recipient through his recipient client device 412.

As noted above, a messaging service may determine, based at least in part on accessed information regarding the configuration of a recipient client device and the applications installed on the recipient client device, whether the recipient client device has installed an application that may be used to access an attachment included within an electronic message. If it is determined that the recipient client device does not have an application installed that may be utilized to access the attachment, the messaging service may substitute the attachment in the electronic message with a link to the application or a marketplace where a recipient may obtain the application required. Alternatively, the messaging service may substitute the attachment with the installer or application itself. Accordingly, FIG. 14 shows an illustrative example of an environment 500 in which a recipient is required to install an application usable to open an attachment in order to access an attachment in accordance with at least one embodiment.

In the environment 500, when the messaging service servers 504 receive an electronic message addressed to a recipient and the electronic message includes an attachment that can be accessed through use of a particular application, the management sub-system 510 may obtain configuration information for the recipient client device 512 that may be used to determine whether the necessary application is installed on the device 512. For instance, the management sub-system 510 may access the user profile data store 506 to access the configuration information for the recipient client device 512. Alternatively, the management sub-system 510 may transmit, through the one or more messaging service servers 504, a request to a messaging application installed on the recipient client device 512 to obtain the required configuration information for the device 512. This information may subsequently be stored within the user profile data store 506 for later use.

Figure 5:
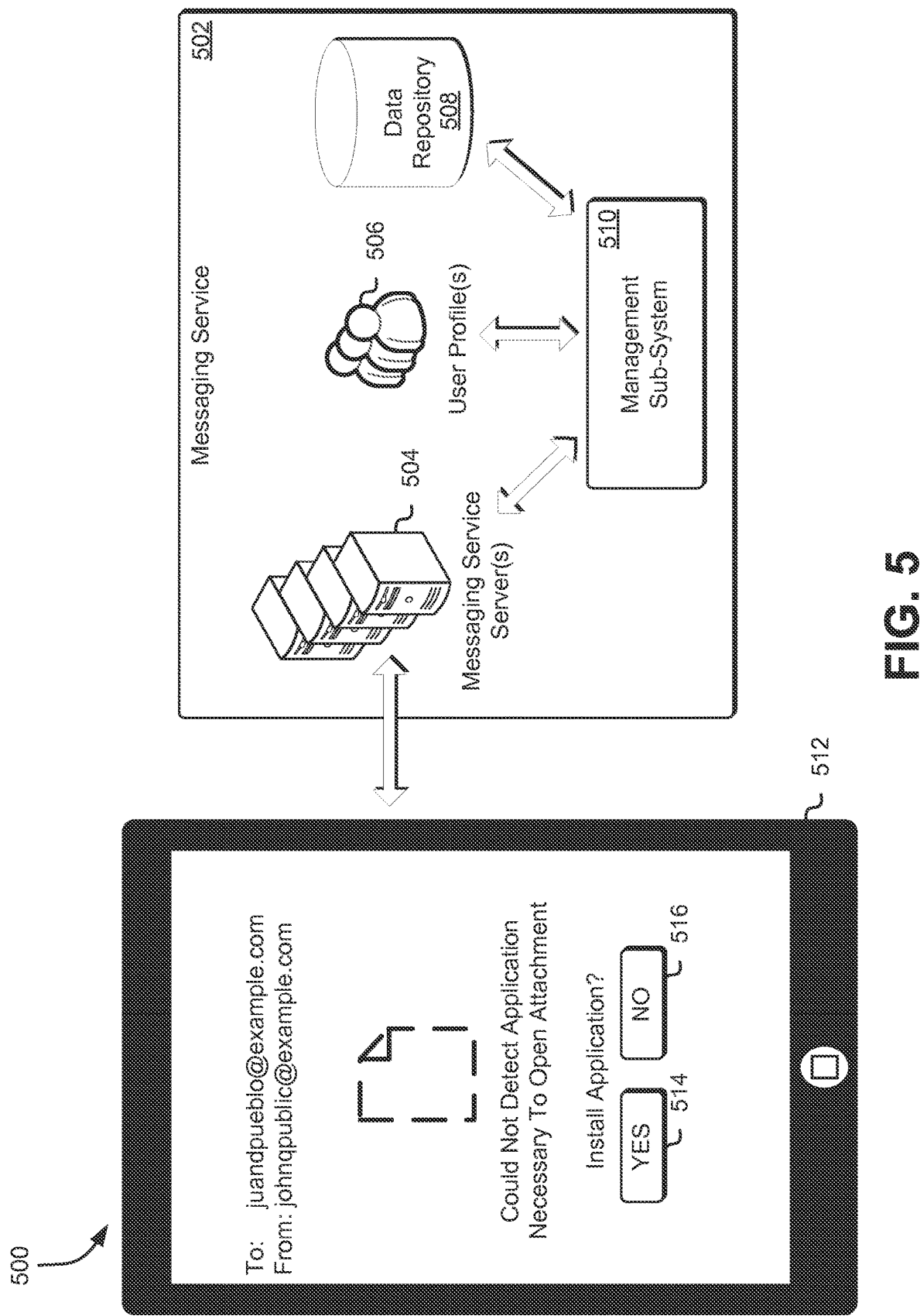
FIG. 5 shows an illustrative example of an environment in which a recipient is required to install an application usable to open an attachment in order to access the attachment in accordance with at least one embodiment.

If the management sub-system 510 determines, based at least in part on the configuration information for the recipient client device 512 that the application needed to access the attachment is not installed on the recipient client device 512, the management sub-system 510 may store the attachment within the data repository 508 and substitute the attachment with a link to the application or an installer for the application, which may be stored within the data repository 508 or in a marketplace service or other service. Alternatively, the management sub-system 510 may substitute the attachment with a copy of the installer or the application itself. When the recipient opens the electronic message using his/her recipient client device 512, he/she may be presented with an option to install the application or otherwise utilize the provided installer to obtain the files necessary to install the application. For example, as illustrated in FIG. 5, when a recipient opens the electronic message, he/she may be presented with a notification indicating that the required application is not installed on the device 512. Further, the electronic message may prompt the recipient to install the required application through a yes button 514 and a no button 516. If the recipient selects the yes button 514, the recipient client device 512 may install the provided application or execute the installer to obtain the necessary files for installation of the required application. However, if the recipient selects the no button 516, the recipient client device 512 may not install the application.

Once the recipient client device 512 has installed the necessary application, the messaging application may transmit a request to the messaging service 502 to obtain the attachment originally included within the electronic message. The management sub-system 510, upon receiving the request, may update the recipient's profile within the user profile data store 506 to indicate availability of the application. Additionally, the management sub-system 510 may access the data repository 508 to retrieve the required attachment and provide the attachment to the recipient client device 512 through the one or more messaging service servers 504. This may enable the recipient to now access the attachment using the installed application on the recipient client device 512.

In some embodiments, the recipient, through a messaging application installed on the recipient client device 512, may specify which applications may be installed or otherwise presented to the recipient in the event that an application necessary to access an attachment is not installed on the recipient client device 512. Additionally, the recipient may specify, for a number of senders of electronic messages, whether the recipient is to be presented with the application necessary to access an attachment provided by these senders. For instance, if the management sub-system 510 determines, based at least in part on the configuration information for the recipient client device 512 that the application needed to access the attachment is not installed on the recipient client device 512, but the recipient has specified that he/she does not want to be presented with the application needed to access the attachment (e.g., not included in the list of approved applications and/or unapproved sender), the management sub-system 510 may forego substituting the attachment with a copy of the installer or the application itself and instead provide a notification within the shortened electronic message that the application needed to access the attachment is unavailable on the recipient client device 512.

Figure 6:
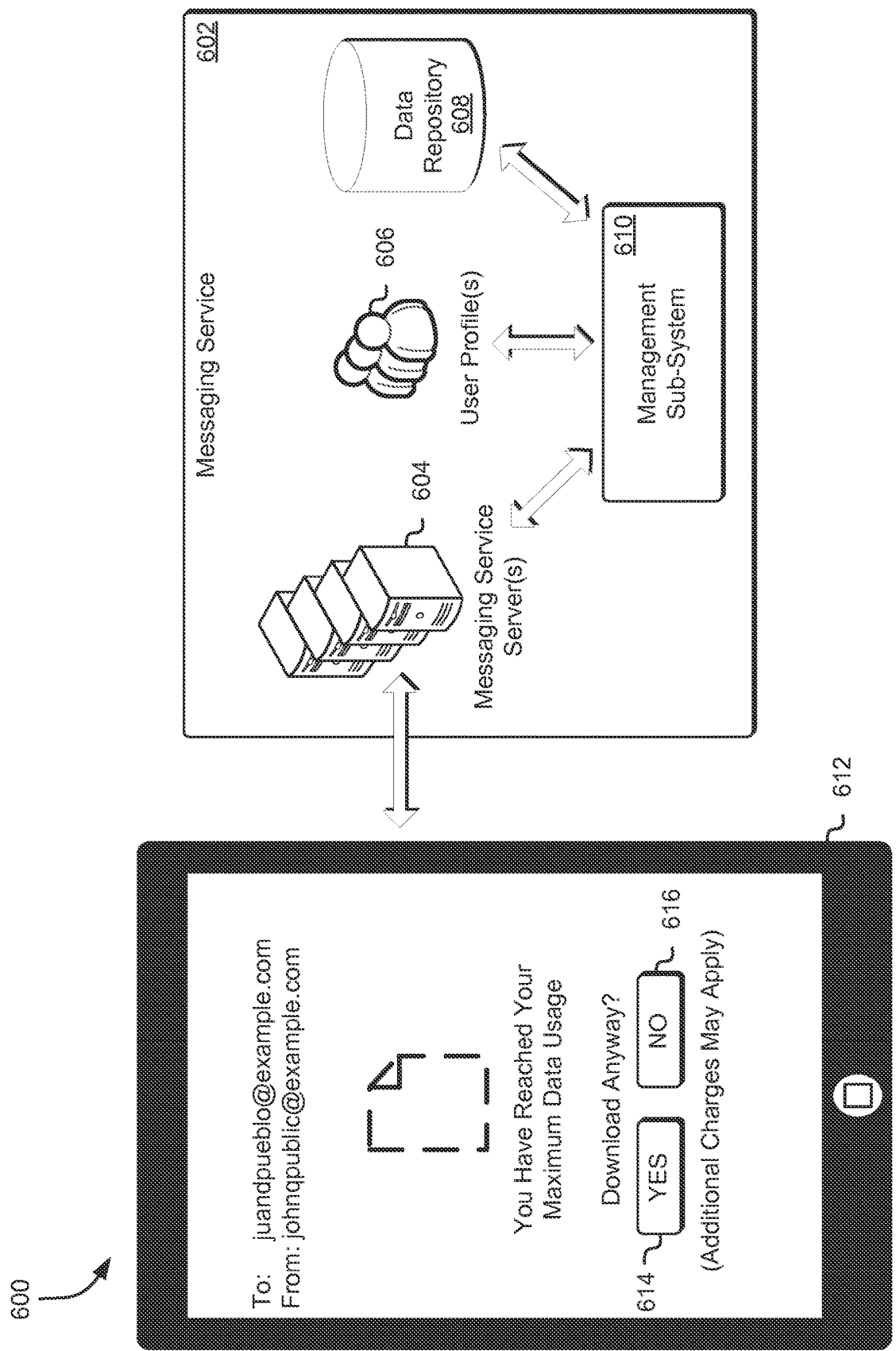
FIG. 6 shows an illustrative example of an environment in which a recipient is prompted to determine whether to download a message attachment as a result of detection of the recipient having reached his/her maximum data usage for a recipient client device in accordance with at least one embodiment.

As noted above, a messaging service may determine, based at least in part on accessed information regarding the data usage limits for a recipient client device whether to substitute an attachment included within an electronic message with a link to the attachment within a data repository. For instance, if the transmitting the electronic message with the attachment would exceed the data usage limit for the recipient client device, the messaging service may store the attachment within a data repository and substitute the attachment with a link to the attachment. Alternatively, if the recipient client device has sufficient data usage capacity remaining, the messaging service may download the entire electronic message onto the recipient client device. Accordingly, FIG. 6 shows an illustrative example of an environment 600 in which a recipient is prompted to determine whether to download a message attachment as a result of detection of the recipient having reached his/her maximum data usage for a recipient client device 612 in accordance with at least one embodiment.

In the environment 600, the one or more messaging service servers 604 of a messaging service 602 may receive, from a sender client device, an electronic message that includes at least one attachment. The electronic message may be addressed to a recipient through a recipient client. Once the messaging service servers 604 receive the electronic message from the sender client device, the management sub-system 610 of the messaging service 602 may determine whether the recipient client device 612 has reached a data usage limit threshold. For instance, the recipient, through the recipient client device 612 may specify a data usage limit over a particular period of time for the device 612 that may be utilized to determine whether certain attachments may be transmitted to the device 612 automatically. This information may be stored within the recipient's profile in the user profile data store 606. Alternatively, if the messaging service 602 is provided by a wireless service provider (e.g., mobile telecommunications, etc.), and the recipient maintains a data usage subscription with the wireless service provider, the management sub-system 610 may obtain the data usage and data usage limits for the recipient client device 612 directly from the wireless service provider and/or the user profile data store 606 without having to access the recipient client device 612 to obtain the information.

Once the management sub-system 610 has obtained the requisite data usage information from the recipient client device 612, the user profile data store 606, or from the wireless service provider, the management sub-system 610 may determine whether downloading the electronic message with the attachment would result in the data usage limit being violated. If downloading the complete electronic message onto the recipient client device 612 would result in violation of this data usage limit, the management sub-system 610 may store the attachment from the electronic message in the data repository 608 and substitute the attachment with a link to the attachment. In an embodiment, the management sub-system 610 may modify the electronic message to include a prompt to the recipient that may enable the recipient to determine whether to download the attachment anyway. For instance, as illustrated in FIG. 6, the electronic message may include a yes button 614 and a no button 616, which may enable the recipient to determine whether the attachment should be downloaded onto the recipient client device 612 or not. If the recipient selects the yes button 614, the recipient client device 612 may transmit a request to the messaging service 602 to download the attachment from the data repository 608. The management sub-system 610 may process this request, obtain the requested attachment from the data repository 608, and download the attachment to the device 612 through use of the one or more messaging service servers 604. Alternatively, if the recipient selects the no button 616, the attachment may not be downloaded. It should be noted that in some embodiments the recipient or the wireless service provider may specify a threshold that may be below the actual data usage limit but that when exceeded may cause any attachments to be stored within the data repository 608.

In some embodiments, the management sub-system 610 may utilize the data usage limit for the recipient client device 612 as one of many factors in determining whether to substitute the attachment with a down-sampled attachment or a link to the attachment within the data repository 608. For instance, the messaging service 602 may define different data usage limit thresholds for determining whether to provide a down-sampled attachment or a link to the attachment. Further, the management sub-system 610 may utilize the configuration information for the recipient client device 612, along with the data usage for the device 612, to make the determination whether to down-sample the attachment or replace the attachment with a link to the attachment within the data repository 608.

As noted above, a messaging service may analyze a recipient's schedule to determine the future availability of the recipient client device. Based at least in part on this future availability, the messaging service may determine whether to provide an electronic message and any included attachments or to store the attachment within a data repository and provide a shortened electronic message that includes a link to the attachment within the data repository. Accordingly, FIG. 15 shows an illustrative example of a process 700 for utilizing a message recipient's schedule to determine whether to provide a message with an attachment originally provided with the message in accordance with at least one embodiment. The process 700 may be performed by the aforementioned messaging service, which may be configured to access a recipient's schedule to determine the availability of the recipient client device. Further, the messaging service may be configured to store attachments and other data within a data repository as needed based at least in part on the determination of the recipient's availability.

At any point, the messaging service may receive 702 an electronic message from a sender client that is addressed to a particular recipient client. The electronic message may include an attachment, which may include one or more computer files that may be accessed by the recipient through his/her recipient client device. Upon receiving this electronic message, the messaging service may detect 704 a triggering event to download the electronic message to a recipient messaging client installed on the recipient client device. For instance, in an embodiment, the messaging service will utilize the receipt of the electronic message as a triggering event to begin the process for downloading the electronic message onto the recipient client device. Alternatively, the messaging service may receive a request from the recipient messaging client to download any electronic messages addressed to the client that are available. The receipt of this request may serve as a triggering event for downloading the received electronic message onto the recipient client device.

Upon detecting the triggering event to download the electronic message onto the recipient client device, the messaging service may access the recipient's schedule. As noted above, the messaging service may access a user profile data store to obtain the recipient's schedule for analysis. For instance, the recipient messaging client installed on the recipient client device may be configured to synchronize the recipient's schedule with the recipient's user profile such that the schedule is maintained on both the recipient client device and the recipient's user profile. This may allow the messaging service to obtain the schedule from the user profile instead of having to access the recipient client device. Alternatively, if the schedule is not synchronized periodically, the messaging service may transmit a request to the recipient messaging client to obtain the most recent version of the recipient's schedule.

The messaging service may subsequently parse 708 the recipient's schedule to identify the recipient's future availability and determine 710 whether the recipient will be unavailable in the near future. For instance, the messaging service may identify any instances within the schedule that indicate unavailability of the recipient client device for a period of time. For example, if the recipient's schedule includes a flight itinerary, this may indicate that the recipient will be on an airplane for an extended period of time with limited to no network connectivity. In another example, if the recipient schedule may indicate that the recipient will be in a location that is known to have very limited or no network connectivity, such as a city with an unstable network infrastructure or a secure facility where network connectivity may be prohibited outside of the facility premises. Utilizing this information, the messaging service may determine 710 whether the recipient will be unavailable in the near future.

If the messaging service determines, based at least in part on the recipient's schedule, that the recipient will be unavailable in the near future or for an extended period of time, the messaging service may provide 712 the electronic message with the attachment to the recipient through the recipient messaging client installed on his/her recipient client device. It should be noted that in some embodiments, the messaging service may access other information that may be utilized in addition to the recipient's schedule to determine whether the electronic message with the attachment is to be provided to the recipient. For instance, the messaging service may evaluate the recipient's data usage limits, the availability of an application suitable to access the attachment, the configuration of the recipient client device, the present location of the recipient client device, and the like to determine whether the electronic message with the attachment is to be provided to the recipient.

If the messaging service determines that the recipient will be available in the near future and the recipient client device will maintain network connectivity, the messaging service may store 714 the attachment included within the electronic message in a data repository maintained by the messaging service or other service and provide 716 a shortened electronic message that includes a link to the attachment within the data repository. This may enable the recipient to select the link within the shortened electronic message at any time to obtain the attachment from the data repository. It should be noted that in some embodiments, other factors may be considered in order to determine whether the attachment is to be stored within a data repository and the electronic message to be shortened. For instance, as will be described in greater detail below, the messaging service may instead down-sample the attachment such that the electronic message, including the down-sampled attachment, consumes a lesser amount of storage capacity within the recipient client device, does not violate one or more data usage limits, and/or conforms to the specifications of the recipient client device.

As noted above, a messaging service may evaluate the current location or any known locations of a recipient client device to determine whether additional security precautions need to be implemented with regard to the transmittal of electronic messages to the recipient. Accordingly, FIG. 16 shows an illustrative example of a process 800 for identifying the location of a recipient's computing device (e.g., recipient client device) to determine whether to provide a message with an attachment originally provided with the message in accordance with at least one embodiment. The process 800 may be performed by the aforementioned messaging service, which may be configured to obtain network information and other information from a recipient client device that may be used to identify the location of the recipient client device. Further, the messaging service may be configured to utilize an authentication component to authenticate the recipient when he/she provides his/her set of credentials to obtain any attachments extracted from electronic messages addressed to the recipient and stored within the data repository.

Figure 7:
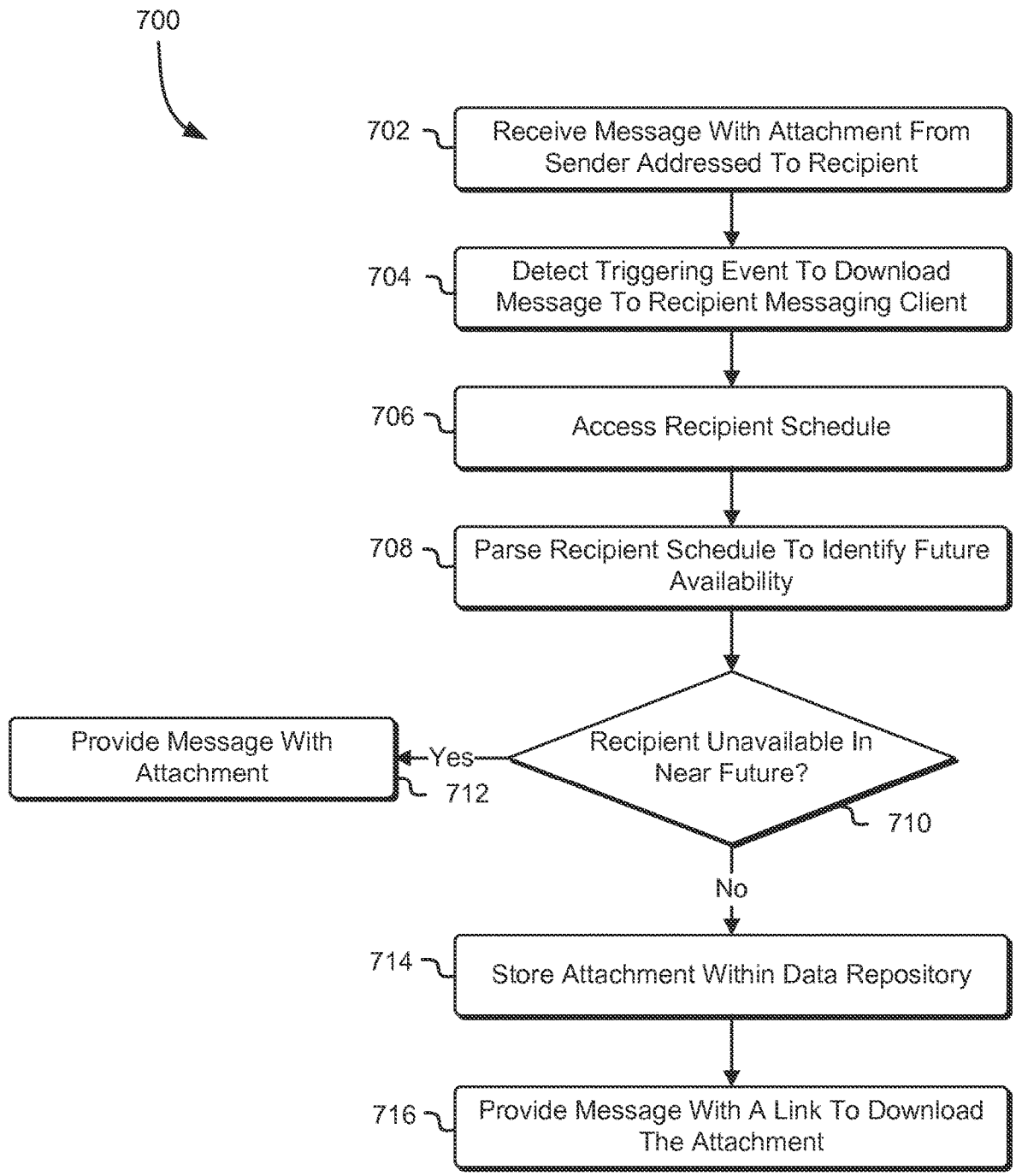
FIG. 7 shows an illustrative example of a process for utilizing a message recipient's schedule to determine whether to provide a message with an attachment originally provided with the message in accordance with at least one embodiment.

As in the process described above in FIG. 7, the messaging service may detect 802 a triggering event to download an electronic message onto the recipient messaging client installed on the recipient client device. For instance, in an embodiment, the messaging service will utilize the receipt of an electronic message from a sender client as a triggering event to begin the process for downloading the electronic message onto the recipient client device. Alternatively, the messaging service may receive a request from the recipient messaging client to download any electronic messages addressed to the client that are available. The receipt of this request may serve as a triggering event for downloading the received electronic message onto the recipient client device.

Once the messaging service has detected the triggering event to download an electronic message onto the recipient client device, the messaging service may determine 804 the present location of the recipient client device and/or known locations where the recipient client device is commonly used. For instance, the messaging service may access the recipient's user profile from the user profile data store to evaluate known network information obtained from the recipient client device that may be used to determine an approximate location for the recipient client device. For instance, the recipient client device may be configured to periodically transmit GPS coordinates, Wi-Fi access point service set identifiers (SSIDs), and Media Access Control (MAC) data that may be utilized to determine 804 the location of the recipient client device. Additionally, or alternatively, the messaging service may transmit a request to the recipient messaging client to obtain the information recited above, which may be used by the messaging service to identify the location of the recipient client device. The messaging service, in some embodiments, may further utilize historical location data for the recipient client device to identify any common locations where the recipient client device is being utilized.

Based at least in part on the determined location of the recipient client device, the messaging service may determine 806 whether access to the electronic message is potentially dangerous. For instance, access to the electronic message may be potentially dangerous if the determined location of the recipient client device includes any location within a rogue nation, locations where the recipient client device may be subject to unwarranted search and seizure, locations where cyber-terrorism and hacking is rife, and the like. Additionally, access to the electronic message may be potentially dangerous if the recipient client device is located within a crowded environment where bystanders may be able to view the electronic message easily. In some embodiments, the sender of the electronic message may identify any instances or scenarios in which access to the electronic message is potentially dangerous. For instance, the sender may specify that access to the electronic message is dangerous if the recipient is attempting to access the message using a device other than a managed device. The messaging service may maintain a database of such potentially dangerous locations and scenarios and, upon evaluation of the location information and other information associated with the recipient client device and the sender's electronic message policies determine whether access to the electronic message is potentially dangerous. If the messaging service determines that access to the electronic message is not potentially dangerous, the messaging service may provide 808 the electronic message, along with any attachments included therein, to the recipient messaging client installed on the recipient client device. It should be noted that in some embodiments, the messaging service may access other information that may be utilized to determine whether the electronic message with the attachment is to be provided to the recipient. For instance, the messaging service may evaluate the recipient's data usage limits, the availability of an application suitable to access the attachment, the configuration of the recipient client device, the recipient's schedule, and the like to determine whether the electronic message with the attachment is to be provided to the recipient.

If the messaging service determines that access to the electronic message is potentially dangerous, the messaging service may store 810 the attachment from the electronic message and any other sensitive information included within the electronic message within a data repository maintained by the messaging service or other trusted service. Sensitive information may include any personal information (e.g., Social Security numbers, addresses, payment information, phone numbers, etc.) or proprietary information included within the message that should not be accessible to unauthorized third parties and may cause financial or reputational harm to the recipient, sender, or any other party involved. In some cases, sensitive information may include the entire content of the electronic message.

Once the messaging service has stored the attachment and any other sensitive information from the electronic message within the data repository, the messaging service may generate 812 a link to an authentication component, which the recipient of the electronic message may use to retrieve the attachment and the sensitive information. The messaging service may then include the link within the shortened electronic message (e.g., no attachments or sensitive information included) and provide 814 this shortened electronic message to the recipient messaging client through the recipient client device. This may enable the recipient of the electronic message to select the link and access the authentication component. The recipient may provide his/her set of credentials through the authentication component, which the messaging service may utilize to authenticate the recipient of the electronic message and determine whether he/she may access the attachment and sensitive information stored within the data repository.

As noted above, the messaging service may access information associated with an application installed on the recipient client device to generate a determination whether to perform a set of operations that includes storing an attachment from an electronic message in a data repository and substituting the attachment within the electronic message with a link to the attachment within the data repository or a down-sampled version of the attachment. Accordingly, FIG. 17 shows an illustrative example of a process 900 for determining how a message is to be provided to a recipient through his/her client device in accordance with at least one embodiment. The process 900 may be performed by the aforementioned messaging service, which may be configured to access a user profile data store and the recipient client device through a messaging client to obtain information about the recipient client device. Further, the messaging service may be configured to substitute any attachment within an electronic message with a link to the attachment stored within the data repository and/or a down-sampled version of the attachment.

Figure 8:
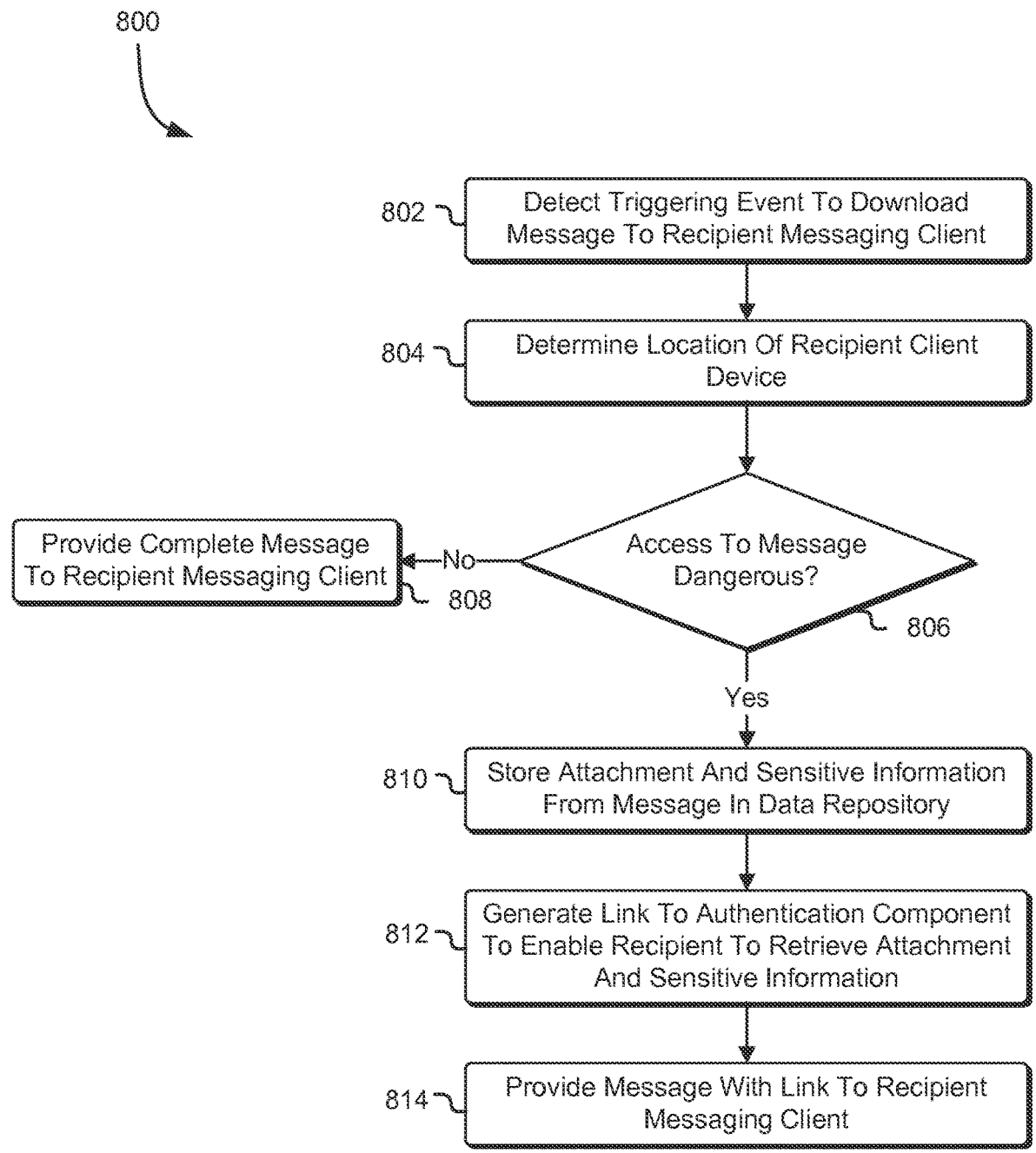
FIG. 8 shows an illustrative example of a process for identifying the location of a recipient's computing device to determine whether to provide a message with an attachment originally provided with the message in accordance with at least one embodiment.
Figure 9:
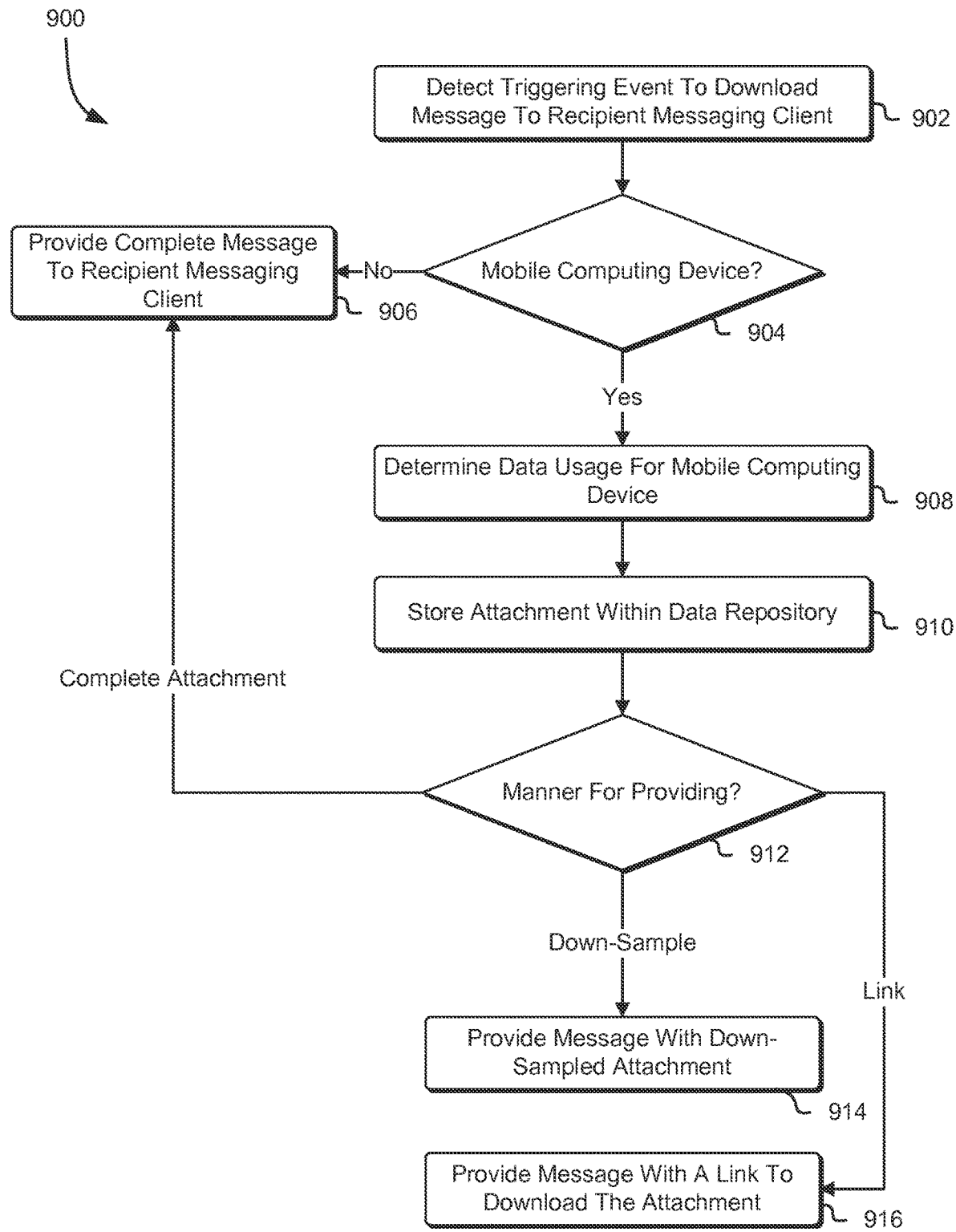
FIG. 9 shows an illustrative example of a process for determining how a message is to be provided to a recipient through his/her computing device in accordance with at least one embodiment.

As in the processes described above in FIGS. 7 and 8, the messaging service may detect 902 a triggering event to download an electronic message onto the recipient messaging client installed on the recipient client device. For instance, in an embodiment, the messaging service will utilize the receipt of an electronic message from a sender client as a triggering event to begin the process for downloading the electronic message onto the recipient client device. Alternatively, the messaging service may receive a request from the recipient messaging client to download any electronic messages addressed to the client that are available. The receipt of this request may serve as a triggering event for downloading the received electronic message onto the recipient client device.

Once the messaging service has detected a triggering event to download the electronic message on to the recipient messaging client installed on the recipient client device, the messaging service may determine 904 whether the recipient client device being utilized to retrieve the electronic message is a mobile computing device (e.g., mobile telephonic devices including advanced operating system software, laptop computers, cellular telephones, tablets, watches including advances operating system software, etc.). If the recipient is utilizing a non-mobile computing device, the messaging service may provide 906 the entire electronic message to the recipient messaging client installed on the device. However, if the recipient client device utilized to retrieve the electronic message is a mobile computing device, the messaging service may determine 908 the data usage for the mobile computing device and any applicable data usage limits imposed by the recipient and/or a wireless service provider. For instance, the recipient, through the recipient client device, may specify a data usage limit over a particular period of time for the device that may be utilized to determine whether certain attachments may be transmitted to the device automatically. This information may be stored within the recipient's profile in the user profile data store. Alternatively, if the messaging service is provided by a wireless service provider (e.g., mobile telecommunications, etc.), and the recipient maintains a data usage subscription with the wireless service provider, the messaging service may obtain the data usage and data usage limits for the recipient client device directly from the wireless service provider and/or the user profile data store without having to access the recipient client device to obtain the information.

Upon determining the data usage for the mobile computing device, the messaging service may store 910 the attachment from the electronic message within the data repository and determine 912 the manner in which the electronic message is to be provided to the recipient client device or otherwise transformed based at least in part on accessed information for the recipient client device. For instance, if the messaging service determines, based at least in part on the data usage for the mobile computing device and other information accessed from the recipient's user profile and the device that the electronic message may include the complete attachment, the messaging service may not transform the electronic message but instead provide 906 the complete electronic message to the recipient messaging client through the recipient client device. For example, if the mobile computing device has not exceeded one or more data usage limits, has sufficient storage capacity for the attachment, is not located within a dangerous location and an application is installed on the device that is usable to access the attachment, the messaging service may transmit the complete message to the device for the recipient's use.

If the messaging service determines that the electronic message is to be transformed by providing a down-sampled attachment, the messaging service may provide 914 a shortened electronic message that includes the down-sampled attachment. For example, as noted above, when the messaging service receives the electronic message from a sender, the messaging service may access the recipient's user profile from the user profile data store to obtain information regarding the recipient client device. Alternatively, the messaging service may transmit a request to the recipient messaging client installed on the recipient client device to obtain the configuration information for the recipient client device. With this information, the messaging service may determine whether the recipient client device is capable of taking advantage of the full attachment within the electronic message.

If the messaging service determines that the recipient client device cannot take advantage of the full attachment, the messaging service substitute a down-sampled attachment within the electronic message. This down-sampled attachment may, for example, have a lower pixel density consistent with the configuration of the recipient client device. Alternatively, the down-sampled attachment may be modified such that the fidelity of the attachment, when accessed through the recipient client device, is sufficient for the recipient client device and is thus usable through the recipient client device. The electronic message may further include a link to the unaltered attachment stored within the data repository to enable the recipient to obtain the attachment as needed.

The messaging service may alternatively determine that the electronic message should be transformed to include a link to the attachment stored within the data repository. If so, the messaging service may provide 916 a shortened electronic message that includes a link to the attachment stored within the data repository. This may enable the recipient to select the link through the recipient messaging client to access the attachment. There are various triggers that may cause the messaging service to substitute the attachment with a link to the attachment within the data repository. For instance, if the messaging service determines that the recipient client device has exceeded a data usage limit, the messaging service may substitute the attachment with a link to the attachment within the data repository along with a notification indicating that the attachment was not downloaded due to the data usage limit. Further, the messaging service may prompt the recipient to download the attachment if so desired. In another instance, messaging service may substitute the attachment with a link to the attachment if, based at least in part on the recipient's schedule, the recipient client device will be available for the foreseeable future.

It should be noted that the process 900 may be performed using additional, fewer, or alternative operations. For instance, in an embodiment, the messaging service is agnostic as to whether the recipient client device is a mobile computing device or not. Thus, the messaging service may not be required to determine 904 whether the recipient client device utilized to obtain an electronic message is a mobile computing device or not. Further, the process 900 may include additional ways in which the electronic message may be provided to the recipient client device. For instance, as described above in connection with FIG. 4, the electronic message may be provided with a link to an authentication component if the messaging service determines that the recipient client device is being utilized in a potentially dangerous location. This may enable the recipient to provide a set of credentials that may be utilized to authenticate the recipient and further enable the recipient to access the attachment and other sensitive information through the data repository. In another instance, the electronic message may include an installer executable file or an application that may be installed on the recipient client device to access the attachment if the messaging service determines that the recipient client device does not have an application necessary to access the attachment. Thus, once the application has been installed, the messaging service may enable the recipient to access the data repository to obtain the attachment.

Figure 10:
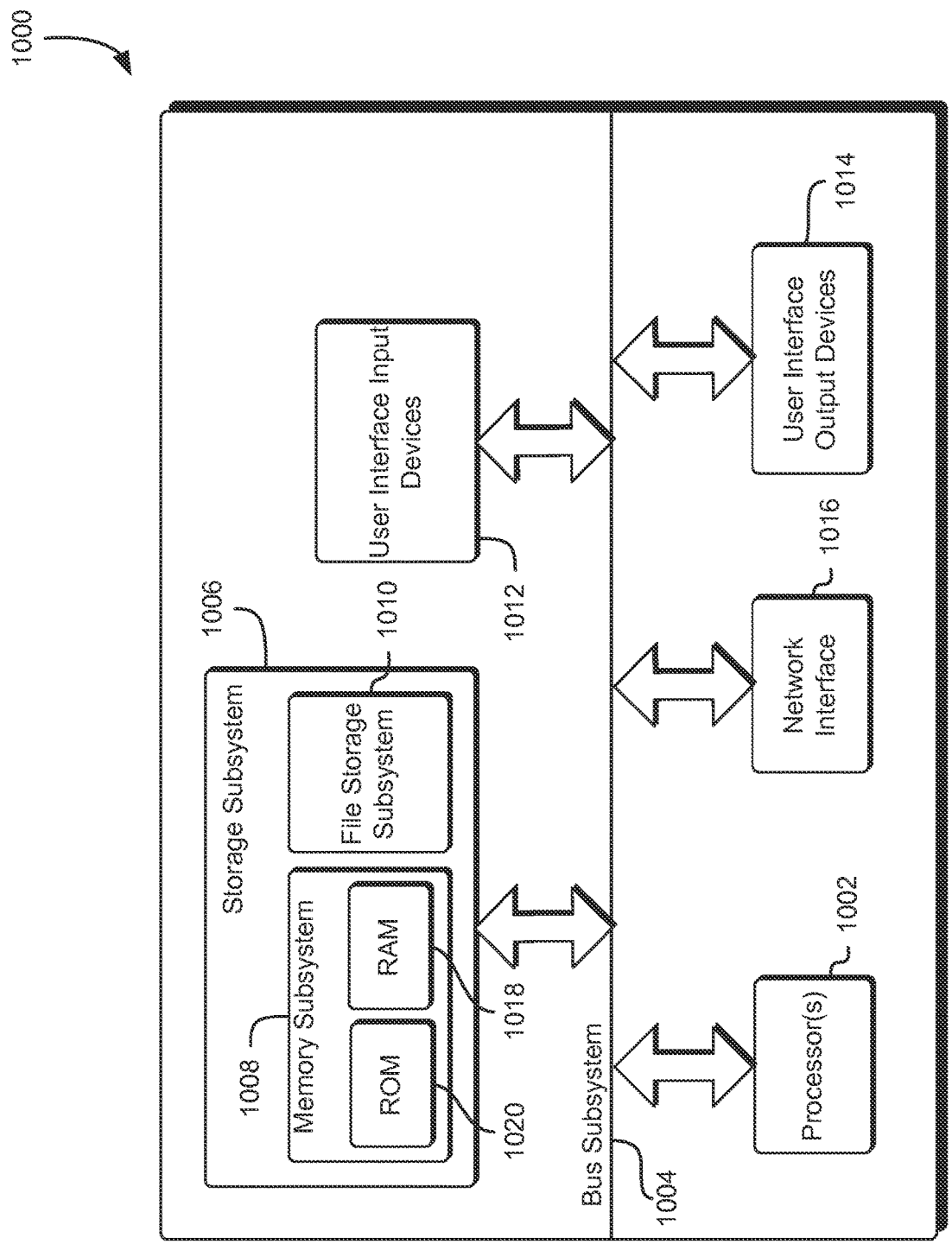
FIG. 10 shows an illustrative example of a recipient client device that may be used to obtain one or more messages from a messaging service in accordance with at least one embodiment.

FIG. 18 shows an illustrative example of a recipient client device that may be used to obtain one or more messages from a messaging service in accordance with at least one embodiment. In various embodiments, the recipient client device 1000 may be used to implement any of the systems illustrated herein and described above. For example, the recipient client device 1000 may be used to receive electronic messages from a messaging service, submit any requests to the messaging service to retrieve any electronic messages and/or attachments, receive attachments and other data from the messaging service, display electronic messages, communicate with other proxy computing devices to access stored data, and/or perform other activities. As shown in FIG. 10, the recipient client device 1000 may include one or more processors 1002 that may be configured to communicate with and are operatively coupled to a number of peripheral subsystems via a bus subsystem 1004. These peripheral subsystems may include a storage subsystem 1006, comprising a memory subsystem 1008 and a file storage subsystem 1010, one or more user interface input devices 1012, one or more user interface output devices 1014, and a network interface subsystem 1016.

The bus subsystem 1004 may provide a mechanism for enabling the various components and subsystems of recipient client device 1000 to communicate with each other as intended. Although the bus subsystem 1004 is shown schematically as a single bus, alternative embodiments of the bus subsystem may utilize multiple busses.

The network interface subsystem 1016 may provide an interface to other device systems and networks. The network interface subsystem 1016 may serve as an interface for receiving data from and transmitting data to other systems from the recipient client device 1000. For example, the network interface subsystem 1016 may enable a customer to connect the recipient client device 1000 to a wireless network such that the customer may be able to transmit and receive data while in a remote location. For example, the customer may utilize the recipient client device 1000 to transmit a request for certain digital content to a digital content provider through a wireless access point. Additionally, the customer may use the device 1000 to receive transmissions from the digital content provider through a similar wireless access point. The network interface subsystem 1016 may also facilitate the receipt and/or transmission of data on other networks, such as a customer network.

The user interface input devices 1012 may include one or buttons, a keyboard, pointing devices such as an integrated mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to the device 1000.

User interface output devices 1014 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the device 1000. The output device(s) 1014 may be used, for example, to present user interfaces to facilitate user interaction with applications performing processes descried herein and variations therein, when such interaction may be appropriate.

The storage subsystem 1006 may provide a computer-readable storage medium for storing the basic programming and data constructs that may provide the functionality of at least one embodiment of the present disclosure. The applications (programs, code modules, instructions) that, when executed by one or more processors, may provide the functionality of one or more embodiments of the present disclosure, may be stored in the storage subsystem 1006. These application modules or instructions may be executed by the one or more processors 1002. The storage subsystem 1006 may additionally provide a repository for storing data used in accordance with the present disclosure. The storage subsystem 1006 may comprise a memory subsystem 1008 and a file/disk storage subsystem 1010.

The memory subsystem 1008 may include a number of memories including a main random access memory (RAM) 1018 for storage of instructions and data during program execution and a read only memory (ROM) 1020 in which fixed instructions may be stored. The file storage subsystem 1010 may provide a non-transitory persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

The device 1000 may be of various types including a portable computer device, tablet computer, a workstation, or any other data processing system that may provide portability for a customer or other user of the device 1000. Additionally, the device system 1000 may include another device that may be connected to the device 1000 through one or more ports (e.g., USB, a headphone jack, Lightning connector, etc.). The device that may be connected to the device 1000 may include a plurality of ports configured to accept fiber-optic connectors. Accordingly, this device may be configured to convert optical signals to electrical signals that may be transmitted through the port connecting the device to the device 1000 for processing. Due to the ever-changing nature of computers and networks, the description of the device 1000 depicted in FIG. 10 is intended only as a specific example for purposes of illustrating the preferred embodiment of the device. Many other configurations having more or fewer components than the system depicted in FIG. 10 are possible.

Figure 11:
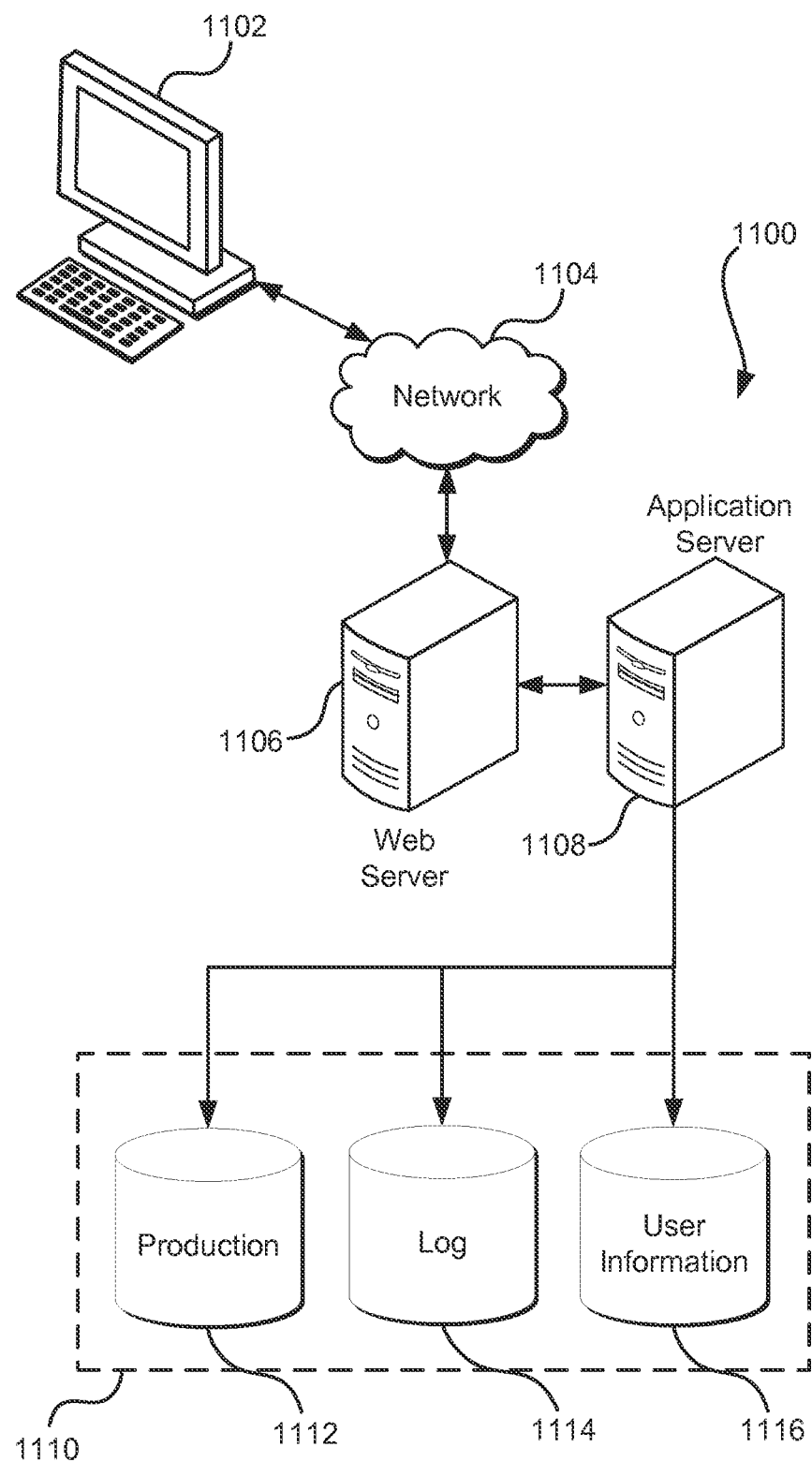
FIG. 11 shows an illustrative example of an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network 1104 can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network 1104 can be enabled by wired or wireless connections and combinations thereof. In this example, the network 1104 includes the Internet, as the environment includes a web server 1106 for receiving requests and serving content in response thereto, although for other networks an alternative device serving a similar purpose could be used as would be apparent to one of ordinary skill in the art.

The illustrative environment includes an application server 1108 and a data store 1110. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server 1108 can include any appropriate hardware, software and firmware for integrating with the data store 1110 as needed to execute aspects of one or more applications for the electronic client device 1102, handling some or all of the data access and business logic for an application. The application server 1108 may provide access control services in cooperation with the data store 1110 and is able to generate content including, text, graphics, audio, video and/or other content usable to be provided to the user, which may be served to the user by the web server 1106 in the form of HyperText Markup Language ("HTML"), Extensible Markup Language ("XML"), JavaScript, Cascading Style Sheets ("CSS"), or another appropriate client-side structured language. Content transferred to a client device may be processed by the electronic client device 1102 to provide the content in one or more forms including, forms that are perceptible to the user audibly, visually and/or through other senses including touch, taste, and/or smell.

The handling of all requests and responses, as well as the delivery of content between the electronic client device 1102 and the application server 1108, can be handled by the web server 1106 using PHP: Hypertext Preprocessor ("PHP"), Python, Ruby, Perl, Java, HTML, XML, or another appropriate server-side structured language in this example. It should be understood that the web server 1106 and application server 1106 are not required and are merely example components, as structured code discussed can be executed on any appropriate device or host machine as discussed elsewhere. Further, operations described as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store 1110 may include mechanisms for storing production data 1112 and user information 1116, which can be used to serve content for the production side. The data store 1110 also is shown to include a mechanism for storing log data 1114, which can be used for reporting, analysis or other purposes. It should be understood that there can be many other aspects that may need to be stored in the data store 1110, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic or a combination of static and dynamic data in response to the received instructions. Dynamic data, such as data used in web logs (blogs), shopping applications, news services and other applications may be generated by server-side structured languages as described or may be provided by a content management system ("CMS") operating on, or under the control of, the application server 1108. In one example, a user, through a device operated by the user, might submit a search request for a certain type of item. In this case, the data store 1110 might access the user information 1116 to verify the identity of the user and can access the catalog detail information to obtain information about items of that type. The information then can be returned to the user, such as in a results listing on a web page that the user is able to view via a browser on the electronic client device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the example environment 1100 in FIG. 11 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network 1104 can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network 11. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage, or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
   receiving, at a messaging server and from a sending system, an electronic message comprising at least one attachment transmitted by the sending system, the electronic message addressed to a user of a recipient system;
   accessing, by the messaging server, from a source other than the electronic message, information about the recipient system as a result of receiving the electronic message from the sending system;
   determining, based at least in part on the accessed information, whether to perform a set of operations that includes storing the at least one attachment from the electronic message in a data repository and substituting the at least one attachment within the electronic message with a link to the at least one attachment within the data repository, wherein the set of operations further includes substituting the at least one attachment within the electronic message with a down-sampled version of the at least one attachment, the at least one attachment includes a first image with a first pixel density, and the down-sampled version of the at least one attachment includes a second image with a second pixel density lower than the first pixel density;
   providing the electronic message with the down-sampled version of the at least one attachment in accordance with the generated determination; and
   providing the electronic message with the link to the recipient system in accordance with determining whether to perform the set of operations such that, as a result of determining to perform the set of operations, the attachment is accessible to the recipient system via the link.

2. The computer-implemented method of claim 1, wherein:
   the set of operations further includes substituting the at least one attachment within the electronic message with an installer for an application required to access the at least one attachment through the recipient system; and
   the method further comprises providing the electronic message with the installer for the application in accordance with the generated determination such that the installer can be utilized to install the application onto the recipient system.

3. The computer-implemented method of claim 1, wherein:
   the set of operations further includes substituting the at least one attachment within the electronic message with a link to an authentication component usable to authenticate a recipient utilizing the recipient system; and
   the method further comprises providing the electronic message with the link to the authentication component such that the recipient is required to provide a set of credentials for authentication and to access the at least one attachment.

4. A system, comprising:
   one or more processors; and
   a memory storing executable instructions that, as a result of being executed on the one or more processors, cause the system to:
      receive an electronic message transmitted by a first system, the electronic message addressed to a user of a second system and comprising at least one component originating with the first system and destined for the second system;
      obtain information about the second system, from a source other than the electronic message, in response to receiving the electronic message from the first system;
      select, based at least in part on the information about the second system and from a set of actions the system is operable to perform with regard to the at least one component, an action to be performed with regard to the at least one component, wherein the action to be performed includes:
         storing the at least one component from the electronic message in a data repository;
         substituting the at least one component within the electronic message with a down-sampled version of the at least one component, wherein the at least one component includes a first image with a first pixel density, and the down-sampled version of the at least one component includes a second image with a second pixel density lower than the first pixel density; and
         providing the electronic message with the down-sampled version of the at least one component; and
      provide the electronic message to the second system in accordance with the action to be performed with regard to the at least one component.

5. The system of claim 4, wherein the at least one component includes a Multi-Purpose Internet Mail Extensions (MIME) part of the electronic message, the MIME part including at least one computer file accessible through the second system.

6. The system of claim 4, wherein the action to be performed with regard to the at least one component includes:
   substituting the at least one component within the electronic message with a link to the at least one component within the data repository.

7. The system of claim 4, wherein the electronic message is a calendar event message that includes at least a meeting request or a task to be performed by a user of the second system.

8. The system of claim 4, wherein the action to be performed includes:
 substituting the at least one component within the electronic message with a link to an authentication component usable to authenticate a recipient utilizing the second system; and
 providing the electronic message with the link to the authentication component such that the recipient is required to provide a set of credentials for authentication and to access the at least one component.

9. The system of claim 4, wherein the information about the second system includes at least one of:
 data usage limits for the second system,
 a location of the second system,
 a schedule associated with a recipient utilizing the second system,
 applications installed on the second system, or
 configuration information for the second system.

10. The system of claim 4, wherein the action to be performed includes:
 providing the electronic message with a link to the at least one component stored in the data repository.

11. The system of claim 4, wherein the action to be performed includes:
 determining, based at least on part on one or more preferences specified by a user of the second system, whether to substitute the at least one component within the electronic message with an application required to access that at least one component through the second system;
 based at least in part on the determination, substituting the at least one component within the electronic message with the application; and
 providing the electronic message with the application such that the application can be installed on the second system.

12. A non-transitory computer-readable storage medium comprising executable instructions that, if executed by one or more processors of a computer system, cause the computer system to at least:
 access information about a recipient system as a result of having received an electronic message originating with a sender system and comprising at least one attachment and addressed to the recipient system, the information about the recipient system accessed from a source other than the electronic message;
 determine, based at least in part on the accessed information, whether to transform the electronic message based, at least in part, on a transformation of the electronic message that includes substituting the at least one attachment with a down-sampled version of the at least one attachment, wherein the at least one attachment includes a first image with a first pixel density, and the down-sampled version of the at least one attachment includes a second image with a second pixel density lower than the first pixel density; and
 provide the electronic message to the recipient system in accordance with the determination whether to transform the electronic message.

13. The non-transitory computer-readable storage medium of claim 12, wherein the accessed information includes at least one of:
 data usage limits for the recipient system,
 known locations where the recipient system has been used,
 a schedule associated with the recipient system,
 applications installed on the recipient system usable to access the at least one attachment, or
 configuration information for the recipient system.

14. The non-transitory computer-readable storage medium of claim 12, wherein the electronic message is a calendar event message that includes at least a meeting request or a task to be performed by a user of the recipient system.

15. The non-transitory computer-readable storage medium of claim 12, wherein the transformation of the electronic message includes substituting the at least one attachment within the electronic message with a link to an authentication component usable to obtain a set of credentials from a recipient utilizing the recipient system and, based at least in part on the set of credentials provided, authenticate the recipient utilizing the recipient system.

16. The non-transitory computer-readable storage medium of claim 12, wherein the transformation of the electronic message includes substituting the at least one attachment within the electronic message with an installer for an application required to access the at least one attachment through the recipient system such that the installer can be utilized to install the application onto the recipient system.

17. The non-transitory computer-readable storage medium of claim 12, wherein the transformation of the electronic message includes substituting the at least one attachment within the electronic message with a link to the at least one attachment.

18. The non-transitory computer-readable storage medium of claim 12, wherein the transformation of the electronic message includes:
 storing the at least one attachment from the electronic message in a data repository; and
 substituting the at least one component within the electronic message with an identifier for the at least one attachment usable to locate the at least one attachment within the data repository.

19. The non-transitory computer-readable storage medium of claim 12, wherein the at least one attachment is a Multi-Purpose Internet Mail Extensions (MIME) part of the electronic message, the MIME part including at least one computer file accessible through at least one application installed on the recipient system.

20. The computer-implemented method of claim 1, wherein the information is associated with a set of characteristics of the recipient system, and the set of characteristics includes at least:
 a data usage limit, or
 a reduced storage capacity.

* * * * *